US012568988B2

(12) United States Patent
Abu-Hardan et al.

(10) Patent No.: US 12,568,988 B2
(45) Date of Patent: Mar. 10, 2026

(54) CHOCOLATE PRODUCTS, INGREDIENTS, PROCESSES AND USES

(71) Applicant: SOCIETE DES PRODUITS NESTLE S.A., Vevey (CH)

(72) Inventors: Madian Othman Abu-Hardan, York (GB); Yvette Fleury Rey, Ursy (CH); Christina Vafeiadi, Lausanne (CH); Joselio Batista Vieira, York (GB)

(73) Assignee: Societe des Produits Nestle S.A., Vevey (CH)

( * ) Notice: Subject to any disclaimer, the term of this patent is extended or adjusted under 35 U.S.C. 154(b) by 656 days.

(21) Appl. No.: 17/754,826

(22) PCT Filed: Oct. 15, 2020

(86) PCT No.: PCT/EP2020/079081
§ 371 (c)(1),
(2) Date: Apr. 13, 2022

(87) PCT Pub. No.: WO2021/074316
PCT Pub. Date: Apr. 22, 2021

(65) Prior Publication Data
US 2024/0099326 A1      Mar. 28, 2024

(30) Foreign Application Priority Data

Oct. 15, 2019   (EP) ..................................... 19203429
Aug. 12, 2020   (EP) ..................................... 20190622

(51) Int. Cl.
*A23G 1/48*      (2006.01)
*A23G 1/02*      (2006.01)

(52) U.S. Cl.
CPC .................. *A23G 1/48* (2013.01); *A23G 1/02* (2013.01)

(58) Field of Classification Search
None
See application file for complete search history.

(56) References Cited

U.S. PATENT DOCUMENTS 3,809,778 A   5/1974  Drevici et al.
4,331,692 A   5/1982  Drevici et al.

FOREIGN PATENT DOCUMENTS

| EP | 0352062 | A2 | 1/1990 |
|---|---|---|---|
| EP | 0755632 | A2 | 1/1997 |
| EP | 3114939 | | 1/2017 |
| EP | 3114941 | | 1/2017 |
| EP | 3498102 | | 6/2019 |
| FR | 2828379 | | 2/2003 |
| JP | 3533181 | B2 | 5/2004 |
| SU | 1219037 | A1 | 3/1986 |
| WO | 2009138418 | | 11/2009 |
| WO | 2010073117 | | 7/2010 |
| WO | 2014127130 | | 8/2014 |
| WO | 2019149909 | A1 | 8/2019 |
| WO | 2020038905 | A1 | 2/2020 |
| WO | 2020115248 | A1 | 6/2020 |

OTHER PUBLICATIONS

Chile Office Action for Appl No. 2022-00806 dated Sep. 1, 2023.
Declercq et al. "Process for Extracting Sugars from Cocoa Pulp" Research Disclosure, 2012, Research Disclosure database No. 582084, 8 pages.
Talbot, "Technologies of Glazed Products and Products with Fillings", 2011, p. 31.
Russian Office Action for Appl No. 2022112348/10 dated Dec. 12, 2024, 9 pages.
European Office Action for Appl No. 20789622.6-1105 dated Jan. 18, 2024.
Office Action Received for Application No. JP2022-521762, mailed on Jul. 30, 2024, 11 Pages of Official Copy.
Maeyama, "How to make Chocolate, Confectionery Encyclopedia", 1st Edition, 1981, pp. 441-467.
Kamiwaki et al., "Effects of Dietary Fiber from Cacao Bean on Blood Pressure and Lipid Metabolism in Spontaneously Hypertensive Rats", Journal of the Japanese Society of Food Science and Engineering, vol. 46, Issue No. 9, 1999, pp. 581-586.
Russian Office Action for Appl No. 2022112348/10 dated Jun. 18, 2024, 11 pages.
Chinese Office Action for Chinese Appl No. 202080069712.2 dated Jun. 21, 2023.
Chile Office Action for Appl No. 202200806 dated Jun. 6, 2024, 17 pages.
Beckett, "The Science of Chocolate", 2nd Edition, 2008, 251 Pages.
Buhlar, "SD Three-Roll Mills. for Top-Quality Requirements", 12 Pages.
Priority Document of EP Application No. 19203429.6, Filed on Oct. 15, 2019, 35 Pages.
European Notice of Opposition for Appl No. 20789622.6-1105 dated Feb. 2, 2025, 36 pages.

*Primary Examiner* — Jyoti Chawla
(74) *Attorney, Agent, or Firm* — K&L Gates LLP

(57) ABSTRACT

The present invention provides a new composition obtainable from a plant in the *Theobroma* genus and the use of that composition as an ingredient in a chocolate product.

20 Claims, No Drawings

CHOCOLATE PRODUCTS, INGREDIENTS, PROCESSES AND USES

CROSS REFERENCE TO RELATED APPLICATIONS

The present application is a National Stage of International Application No. PCT/EP2020/079081, filed on Oct. 15, 2020. which claims priority to European Patent Application No. 19203429.6, filed on Oct. 15, 2019, and European Patent Application No. 20190622.9, filed on Aug. 12, 2020, the entire contents of which are being incorporated herein by reference.

The present invention relates to the field of new chocolate-like and chocolate products, new ingredients for use in said products and uses of the new ingredients.

BACKGROUND

Whilst it is well known that the cocoa plant is harvested to produce cocoa seeds that are used to provide cocoa liquor, cocoa butter and cocoa powder, other portions of the cocoa pod are not utilised.

The cocoa pod consists of a husk, pulp and cocoa beans. The pulp is an aromatic, moist body that surrounds the pods.

In initial processing of the cocoa seed, the pulp is typically removed by fermentation and is hydrolysed by microorganisms. Hydrolysed pulp is known in the industry as "sweatings." During fermentation, the pulp provides the substrate for various microorganisms, which are essential to the development of chocolate flavour precursors, which are fully expressed later, during the roasting process. Although pulp is necessary for fermentation, often more pulp occurs than is needed.

Excess pulp has been used to produce cocoa jelly, alcohol and vinegar, nata, and processed pulp. By controlled fermentation and distillation, sweatings can be made into an alcoholic spirit containing over 40% ethanol. The alcohol produced can be further fermented to produce acetic acid.

Cocoa sweatings have been shown to be a suitable substrate for fermentation to produce nata, a product normally obtained from fermentation of coconut water.

Additionally, raw cacao pulp has been used to produce smoothies and other so-called "health" drinks. However, the composition and availability of the pulp has impacted its commercial usefulness.

The Applicant has provided means of utilising this material more effectively in foodstuff, specifically chocolate-product, manufacture in WO2019115731, WO2019115735 and WO2019149909.

EP 3114939 and EP 3114941 mention the possibility of using cocoa pulp as a sweetener. However, these documents do not actually disclose how to do this. These documents also relate to a specific three-phase separation variant of the traditionally chocolate manufacturing process rather than the combined process discussed below.

FR 2828379 relates to using cocoa husk, not the bean content, in nutrient compositions.

U.S. Pat. No. 4,331,692 relates to uses of the cocoa pulp once separated from the remainder of the bean and food products containing this material.

The present invention seeks to provide methods and products that utilise other portions of the fruit of the *Theobroma* genus plants. These products and methods offer advantages in sustainability. Additionally, the present invention provides processes that allow potential ingredients in said plants to be commercially effective.

Furthermore, the invention provides entirely new products that impart new sensorial properties. Specifically, the treatment allows the sweetness of the cocoa mass alternatives to be increased and maintain processability of such products into chocolate.

The present application also offers increased control of the fermentation process in providing these new compositions by combining portions of the seed at controllable steps in the fermentation process and production process.

Thus, the present invention enables the solution to the issues of how to provide:

Improvement of consistency of product and process by fermenting and/or enzymatic hydrolysis of a paste rather than individual beans (reduction of poorly fermented beans);

Enables controlled fermentation of paste to specific controlled microorganisms;

Decrease in contamination as cocoa shell is not exposed to fermentation and drying in potentially inappropriate conditions;

An increase in fibre content of chocolate products in a controllable manner as part of a more streamlined process; and More homogenous dying and roasting conditions due to the removal of individual beans from the process.

SUMMARY OF INVENTION

The present invention relates to products that comprise a composition obtainable from a plant within the genus *Theobroma*. The present invention also provides new compositions obtainable from the plant genus *Theobroma*.

The present invention provides:

a material derived from a plant in the *Theobroma* genus, preferably in the form of a paste, a treated, preferably enzymatically treated, version of the above material, a fermented version of the above materials, a dried version of the above materials, a roasted version of the above materials, and processes to prepare the above materials.

In a preferred embodiment, the above materials are used as intermediates in chocolate product composition manufacture.

Additionally, the present invention provides processes for increasing the sweetness of *Theobroma* derived materials and compositions.

Specifically, the present invention provides a process for producing a material derived from a plant in the *Theobroma* genus comprising the steps of:

a. reducing the size of seeds and/or a portion of seeds of a plant in the *Theobroma* genus optionally in the presence of:

i. pulp and/or an extract of pulp of a plant in the *Theobroma* genus, and/or ii. a non-pulp and non-seed portion of the fruit of a plant in the *Theobroma* genus, b. if both of i. and ii. are not present in step a., mixing the product of step a. with either or both of i, and/or ii.

The present invention may also preferably involve a step of fermenting the above-mixture.

Additionally, the present invention provides a composition produced by the above process.

This product could preferably be described as an alternative to traditional cocoa mass/liquor as the product is obtained from the seeds of the *Theobroma* genus but also preferably incorporating sugars from the pulp and/or non-pulp and non-seed portions of the fruit.

The present invention preferably provides a, preferably non-added sugar, chocolate product that comprises a composition obtainable the composition of the present invention.

The present invention provides advantageous properties in respect of a reduction, or entire removal, of added sugar, with the sweetness being provided from a natural source, that preferably also contains other components of the cocoa pod that contribute to the flavour of the chocolate.

Additionally, the present invention provides a means of increasing the sugar content in components of the fruit of the *Theobroma* genus.

Accordingly, the present invention provides an alternative for added sugars by providing naturally occurring sugars that are present in the source of cocoa mass, cocoa butter and/or cocoa powder.

Additionally, the present invention provides the use of a by-product of the chocolate manufacturing process that is typically discarded. Hence, the present invention provides advantages in respect of sustainability and/or flavour differentiation.

In an embodiment, components within the mixture are hydrolysed, preferably enzymatically, to reduce the polysaccharide content. In an embodiment, the treatment of the mixture may increase the mono- and/or di- and/or oligo-saccharide content.

The treatment with an enzyme may lead to improved mouthfeel in chocolate product products, preferably chocolate, containing the composition of the present invention.

In an embodiment, the treatment of the pulp or pulp extract in the mixture with an enzyme lowers the viscosity of the pulp or pulp extract. This aspect of the invention provides advantages in respect of processing of the composition into products, and/or removes any potential unwanted organoleptic properties from using an overly viscous raw material.

Specifically, the present invention provides the compositions, methods and uses described in the claims.

DETAILED DESCRIPTION

Pulp, Seeds and Fruit and Subsequent Mixture The pulp preferably for use in the present invention is obtained from a plant or plants from the genus *Theobroma*. The plant genus comprises *Theobroma angustifolium, Theobroma bicolor* (mocambo), *Theobroma cacao, Theobroma canumanense, Theobroma grandiflorum* (cupuagu), *Theobroma mammosum, Theobroma microcarpum, Theobroma obovatum, Theobroma simiarum, Theobroma speciosum, Theobroma stipulatum Theobroma subincanum,* and *Theobroma sylvestre.* Preferably, the pulp is selected from cacao, cupuacu and mocambo and mixtures thereof, preferably cacao (cocoa).

The embodiments described below when mentioned in respect of the preferred embodiment cocoa, but are equally applicable to pulp from all other plants in the genus *Theobroma.*

In the present invention, the term "pulp" relates to the mucilage-like coating around each bean.

In the present invention, the term "cocoa pulp" also encompasses dried cocoa pulp, for example, in the form of a powder. However, where the term "dried cocoa pulp", for example, is used the cocoa pulp is limited to dried cocoa pulp. The origin of the cocoa pulp is not particularly limited and all known varieties of cocoa pod may provide the pulp. However, it is preferred that the sugar content of the cocoa pulp is as high as possible.

In the present invention, the term "extract" has the normal dictionary meaning, i.e. a portion of cocoa pulp comprising one or more components of cocoa pulp wherein one or more components of the original cocoa pulp have been removed to provide the extract. In the present invention, any water present in the cocoa pulp is not taken as being the extract, i.e. the cocoa pulp extract is not water. In an embodiment of the present invention, the cocoa pulp extract is in the form of a powder, i.e. the cocoa pulp extract has been dried to remove water.

In the present invention, the term "seed" relates to the normal dictionary meaning of the term, i.e. includes the portion of the fruit pod called "beans", e.g. cocoa beans. A portion of the seed encompasses the kernel (containing two cotyledons), seed coat (bean shell or husk) and embryo (germ) or a seed broken into pieces (i.e. not a whole seed).

The portion of seed may also optionally comprise cocoa nibs and/or cocoa shells, preferably these components are preparing by roasting and breaking/winnowing beans.

In the present invention, the non-pulp and non-seed portion of the fruit encompasses the remainder of the fruit, for example, comprising funicle, placenta, endocarp, mesocarp and/or endocarp, particularly preferable the placenta.

In an embodiment, the components seeds/portion of seeds and (i) pulp and/or extract of pulp and/or (ii) non-pulp and non-seed portion may be individually extracted from the fruit and then recombined or the relevant portions of the fruit may be combined and then reduced in size.

For example, the seeds may be fully or partially depulped and then the seeds may then be recombined with the necessary amount of pulp and/or pulp extract.

In an embodiment, by individually extracting the components mixed in claim 1, any necessary pre-treatments may be carried out. For example, the seeds and/or portion of seeds may be treated with acid or alkali prior to combining with other components as required by the present invention.

In an embodiment, the pulp and/or pulp extract and/or the non-pulp and non-seed portion may be treated to reduce the polysaccharide content and/or increase the content of mono- and/or di-saccharides by the methods described herein prior to combining with the seeds and/or portion of seeds or treated after combined with the seed and/or portions of seeds.

In an embodiment, the component parts may be added dehydrated and reconstituted using water. In an embodiment, the pulp may be treated in any standard manner before combining, e.g. filtered, concentrated, pasteurised, and/or debacterialised etc.

In an embodiment, the mixture produced in step a. or step b. of the present invention comprises between 1.0 and 80.0wt %, preferably between 5.0 and 75.0wt %, preferably between 10.0 and 70.0wt % and preferably between 15.0 and 65.0wt % of the pulp, extract of the pulp and/or the non-pulp and non-seed portion of the fruit. The percentages referred to relate to the actual weight of the components, i.e. not on a dry basis as the pulp may contain a significant amount of water.

In an embodiment, the mixture produced in step a. or step b. of the present invention comprises between 0.0 and 80.0wt %, preferably between 10.0 and 75.0wt %, preferably between 20.0 and 70 wt % and preferably between 25.0 and 65.0wt % of the pulp and/or extract of the pulp, preferably of the pulp. The percentages referred to relate to the actual weight of the components, i.e. not on a dry basis as the pulp may contain a significant amount of water.

In an embodiment, the mixture produced in step a. or step b. of the present invention comprises between 0.0 and 80.0wt %, preferably between 5.0 and 70.0wt %, preferably between 10.0 and 50.0wt % and preferably between 15.0 and 55.0wt % of the non-pulp and non-seed portion of the fruit. The percentages referred to relate to the actual weight of the components, i.e. not on a dry basis.

The process of the present invention allows the incorporation of a non-seed, non-pulp portion of the bean at a position in the production process where it can be controlled and processed along with the other ingredients, as well as the use of the seed. This can afford an increase in the fibre content of the chocolate, which is desirable from a consumer health point of view, whilst minimising the processing difficulties of adding a fibre source to a chocolate mass.

Adding a fibre source later in the production process can lead to issues with viscosity and processing but the addition early in the overall process affords an increase in the control and options for subsequent processing to minimise the impact of addition.

Specifically, in a highly preferred embodiment, as mentioned below, the enzymatic treatment of the present invention affords a reduction in the fibre content to a degree that allows processability but the method of the present invention affords an overall increase in fibre content relative to traditional chocolate. The combined impact of the present invention allows an increase in the ease in which fibre content can be increased without a corresponding increase in processing difficulty.

In an embodiment, the mixture produced in step a. or step b. of the present invention comprises between 20.0 and 99.0wt % of the mixture, preferably between 25.0 and 95.0wt %, preferably between 30.0 and 90.0wt % and preferably between 35.0 and 85.0wt % of the seeds and/or portion of seeds. The percentages referred to relate to the actual weight of the components, i.e. not on a dry basis.

In a preferred embodiment, the process of the present invention provides a size reduction in step a. that involves a step of grinding, milling, crushing, grating and/or powdering. This size reduction may be carried out by any apparatus suitable dependent on the amount of mixture being processed. Industrially available cocoa bean processing machines may be used.

In a preferred embodiment, the process of the present invention, wherein the size reduction in step a. involves a reduction to a size of between 10 and 500 μm, optionally to between 20 and 450 μm, optionally to between 30 and 400 μm, preferably between 30 and 250 μm or between 40 and 150 μm.

In an embodiment, the above particle size refers to d50 (preferably diameter where 50% of the mass of the particles in the sample have a diameter below that value). Preferably, laser diffraction is used to measure the particle size, d50 using a Malvern Mastersizer 2000, Method Scirocco 2000 dry attachment, Fraunhofer scattering theory.

In an embodiment of the present invention, the process steps a. or b. provide a paste, preferably a paste with a moisture content of between 0.5 and 80% as a weight percentage of the paste.

By forming a paste, the present allows the improvement of consistency of any fermentation steps, i.e. removes the lack of homogeneity in a bean pile and reduces the number of poorly fermented beans. The removal of any cocoa shell contamination from the fermentation body also provides advantages in the present invention, i.e. no fermentation occurs near the outer shell. Additionally, the production of the paste in a controlled environment removes any possibility of fermentation occurring in unsanitary locations. Further, the paste production allows the control of addition of specifically microorganisms, processing aids etc., i.e. these can be added in a controlled manner to a more homogeneous substrate than fermenting beans. This provides more options for flavour modification under a controlled environment.

In a preferred embodiment, the paste comprises greater than 2.5% by weight of the paste of moisture, preferably greater than 5% by weight, and preferably greater than 10% by weight.

In a preferred embodiment, the paste comprises water in an amount of less than 70% by weight, preferably less than 60% by weight, preferably less than 50% by weight and most preferably less than 40% by weight. For example, between 2.5% and 80%, between 2.5% and 70% or between 2.5% and 60%, and most preferably between 40% and 70%.

In a preferred embodiment, the moisture, preferably water, content is measured using Karl Fischer analysis, Orion 2 Turbo with methanol:formamide 2:1 or a halogen moisture analyser (e.g. a Mettler-Toledo balance) or weight loss in an oven, 5 g sample for 5 hours at 102° C.

In a preferred embodiment, the mixture of step a. or step b., preferably a paste, has a sugar content, preferably a mono- and di-saccharide content, of greater than 3.0wt %, preferably greater than 5.0wt %, preferably greater than 6.0wt % and preferably greater than 8.0wt %. In a preferred embodiment, the mixture of step a. or step b., preferably a paste, has a sugar content, preferably a mono- and di-saccharide content, of less than 20.0wt %, preferably less than 17.5 wt %, preferably less than 15.0wt % and preferably less than 12.0wt %. Preferably, from 3.0wt % to 20.0wt % or from 5.0wt % to 15.0wt %. The percentages referred to relate to the actual weight of the components, i.e. not on a dry basis.

On a dry weight basis, in a preferred embodiment, the mixture of step a. or step b., preferably a paste, has a sugar content preferably a mono- and di-saccharide content, of from 10.0wt % to 40.0wt %, preferably from 15.0wt % to 35.0wt % and preferably from 17.5 wt % to 32.5 wt %.

In a preferred embodiment, the sugar comprises a mixture comprising sugars selected from the group comprising maltose, sucrose, fructose, galactose, and glucose, preferably the mixture comprises fructose and glucose. In a preferred embodiment, the sugar mixture of the present invention comprises at least 75 wt % based on the weight of the sugar mixture of a combination of glucose and fructose, preferably at least 80w % or at least 85 wt % or at least 90 wt %. In a preferred embodiment, the sugar mixture of the present invention comprises less than 100 wt % based on the weight of the sugar mixture of a combination of glucose and fructose, preferably less than 99.5 wt % or less than 99 wt % or less than 95 wt %. Preferably, between 75 wt % and 100 wt % or between 85 wt % and 99 wt %.

In a preferred embodiment, where the mixture of step a. or step b., preferably a paste, has been treated to reduce the polysaccharide content, preferably by enzymatic treatment disclosed here, the sugar content is preferably increased over non-treated mixture.

In a preferred embodiment, the treated mixture of step a. or step b., preferably a paste, has a sugar content, preferably a mono- and di-saccharide content, of greater than 6.0wt %, preferably greater than 7.0wt %, preferably greater than 8.0wt %, preferably greater than 8.5 wt % and preferably greater than 9.0wt %. In a preferred embodiment, the treated mixture of step a. or step b., preferably a paste, has a sugar content, preferably a mono- and di-saccharide content, of less than 20.0wt %, preferably less than 17.5 wt %, preferably less than 15.0wt % and preferably less than 12.0wt %.

Preferably, from 6.0wt % to 20.0wt %, from 7.0wt % to 20.0wt % or from 8.5 wt % to 15.0wt %. The percentages referred to relate to the actual weight of the components, i.e. not on a dry basis.

On a dry weight basis, in a preferred embodiment, the treated mixture of step a. or step b., preferably a paste, has a sugar content preferably a mono- and di-saccharide content, of from 10.0wt % to 40.0wt %, preferably from 15.0wt % to 40.0wt %, preferably from 22.0wt % to 35.0wt % and preferably from 25.0wt % to 35.0wt %.

In a preferred embodiment, the mixture of step a. or step b., preferably a paste, has a total dietary fibre content, i.e. insoluble and soluble, of greater than 2.0wt %, preferably greater than 3.0wt %, preferably greater than 4.0wt % and preferably greater than 5.0wt %. In a preferred embodiment, the mixture of step a. or step b., preferably a paste, has a total dietary fibre content, i.e. insoluble and soluble, of less than 15.0wt %, preferably less than 13.0wt %, preferably less than 12.0wt %, preferably less than 10.0wt %, preferably less than 9.0wt % and preferably less than 8.0wt %. Preferably, from 2.0wt % to 12.0wt % or from 4.0wt % to 10.0wt %.

The percentages referred to relate to the actual weight of the components, i.e. not on a dry basis.

On a dry weight basis, in a preferred embodiment, the mixture of step a. or step b., preferably a paste, has a total dietary fibre content, i.e. insoluble and soluble, of from 5.0wt % to 45.0wt %, 5.0wt % to 40.0wt %, 5.0wt % to 30.0wt %, preferably from 10.0wt % to 25.0wt % and preferably from 12.0wt % to 20.0wt %.

In a preferred embodiment, where the mixture of step a. or step b., preferably a paste, has been treated to reduce the polysaccharide content, preferably by enzymatic treatment disclosed here, the total dietary fibre content, i.e. insoluble and soluble is decreased over non-treated mixture or paste. In a preferred embodiment, the insoluble dietary fibre content is reduced to a greater extent than the soluble dietary fibre.

In a preferred embodiment, the treated mixture of step a. or step b., preferably a paste, has a total dietary fibre content, i.e. insoluble and soluble, of greater than 2.0wt %, preferably greater than 3.0wt %, preferably greater than 4.0wt % and preferably greater than 4.5 wt %. In a preferred embodiment, the treated mixture of step a. or step b., preferably a paste, has a total dietary fibre content, i.e. insoluble and soluble, of less than 10.0wt %, preferably less than 8.5 wt %, preferably less than 8.0wt % and preferably less than 7.0wt %. Preferably, from 2.0wt % to 10.0wt % or from 3.0wt % to 8.0wt %. The percentages referred to relate to the actual weight of the components, i.e. not on a dry basis.

On a dry weight basis, in a preferred embodiment, the treated mixture of step a. or step b., preferably a paste, has a total dietary fibre content, i.e. insoluble and soluble, of from 8.0wt % to 30.0wt %, preferably from 10.0wt % to 25.0wt % and preferably from 12.0wt % to 20.0wt % or 12.0wt % to 17.0wt %.

In a preferred embodiment, the non-treated the mixture of step a. or step b., preferably a paste, has a total dietary fibre content, i.e. insoluble and soluble, of greater than 4.0wt %, preferably greater than 5.0wt %, preferably greater than 5.5 wt % and preferably greater than 6.0wt %. In a preferred embodiment, the non-treated mixture of step a. or step b., preferably a paste, has a total dietary fibre content, i.e. insoluble and soluble, of less than 15.0wt %, preferably less than 13.0wt %, preferably less than 12.0wt %, preferably less than 10.0wt %, preferably less than 8.5 wt %, preferably less than 8.0wt % and preferably less than 7.0wt %. Preferably, from 4.0wt % to 15.0wt %, from 4.0wt % to 10.0wt % or from 5.5 wt % to 8.0wt %. The percentages referred to relate to the actual weight of the components, i.e. not on a dry basis.

On a dry weight basis, in a preferred embodiment, the non-treated mixture of step a. or step b., preferably a paste, has a total dietary fibre content, i.e. insoluble and soluble, of from 5.0wt % to 45.0wt %, 10.0wt % to 40.0wt %, 12.0wt % to 30.0wt %, preferably from 14.0wt % to 25.0wt % and preferably from 15.5 wt % to 20.0wt %.

In a preferred embodiment, the treated mixture of step a. or step b., preferably a paste, has an insoluble dietary fibre content of greater than 0.25 wt %, preferably greater than 0.5 wt %, preferably greater than 1.0 wt % and preferably greater than 1.5 wt %. In a preferred embodiment, the treated mixture of step a. or step b., preferably a paste, has an insoluble dietary fibre content of less than 6.0wt %, preferably less than 5.0wt %, preferably less than 4.0wt % and preferably less than 3.0wt %. Preferably, from 0.25 wt % to 6.0wt % or from 0.5 wt % to 4.0wt %. The percentages referred to relate to the actual weight of the components, i.e. not on a dry basis.

On a dry weight basis, in a preferred embodiment, the treated mixture of step a. or step b., preferably a paste, has an insoluble dietary fibre content of from 4.0wt % to 15.0wt %, preferably from 5.0wt % to 12.0wt % and preferably from 5.0wt % to 10.0wt %.

In a preferred embodiment, the non-treated mixture of step a. or step b., preferably a paste, has an insoluble dietary fibre content of greater than 3.0wt %, preferably greater than 4.0wt %, preferably greater than 4.5 wt % and preferably greater than 5.0wt %. In a preferred embodiment, the non-treated mixture of step a. or step b., preferably a paste, has an insoluble dietary fibre content of less than 10.0wt %, preferably less than 8.0wt %, preferably less than 7.5 wt % and preferably less than 6.0wt %. Preferably, from 3.0wt % to 10.0wt % or from 4.5 wt % to 7.5 wt %. The percentages referred to relate to the actual weight of the components, i.e. not on a dry basis.

On a dry weight basis, in a preferred embodiment, the non-treated mixture of step a. or step b., preferably a paste, has an insoluble dietary fibre content of 8.0wt % to 30.0wt %, preferably from 8.0wt % to 25.0wt %, preferably from 10.0wt % to 20.0wt % and preferably from 11.5 wt % to 17.5 wt %.

Accordingly, in a highly preferred embodiment, the present invention provides a paste that comprises:
   sugar content, preferably a mono- and di-saccharide content, of from 3.0wt % to 20.0wt %,
   a total dietary fibre content, i.e. insoluble and soluble, of from 2.0wt % to 15.0wt %, and
   a moisture content of between 20.0wt % and 80 wt %, preferably between 40.0wt % and 70.0wt %.

Accordingly, in a highly preferred embodiment, the present invention provides a treated (preferably enzymatically treated as described below) paste that comprises:
   sugar content, preferably a mono- and di-saccharide content, of from 6.0wt % to 20.0wt %,
   a total dietary fibre content, i.e. insoluble and soluble, of from 2.0wt % to 10.0 wt %,
   a moisture content of between 20.0wt % and 80 wt %, preferably between 40.0wt % and 70.0wt %, and
   preferably an insoluble dietary fibre content of from 0.25 wt % to 6.0wt %.

Accordingly, in a highly preferred embodiment, the present invention provides a non-treated paste that comprises:

sugar content, preferably a mono- and di-saccharide content, of from 3.0wt % to 8.5 wt %, a total dietary fibre content, i.e. insoluble and soluble, of from 4.0wt % to 10.0wt % or from 4.0wt % to 13.0wt %, a moisture content of between 20.0wt % and 80 wt %, preferably between 40.0wt % and 70.0wt %, and preferably an insoluble dietary fibre content of from 3.0wt % to 10.0wt %.

In a preferred embodiment, the mixture produced in step a. or step b. comprises:

between 20.0 and 99.0wt % of the seeds and/or portion of seeds, preferably between 30.0 and 75.0wt % of the seeds and/or portion of seeds;

between 0.0 and 80.0wt % of the non-pulp and non-seed portion, preferably between 0.0 and 20.0wt %; and between 1.0 wt % and 80.0 of the pulp and/or extract of the pulp, preferably between 25.0 and 70.0wt % of the pulp and/or extract of the pulp.

In a highly preferred embodiment, the present invention provides a paste comprising:

between 20.0 and 99.0wt % of beans, preferably between 30.0 and 75.0wt % of beans, between 0.0 and 30.0wt % of the non-pulp and non-seed portion, preferably between 2.0 and 15.0wt %, and preferably where the non-pulp and non-seed portion is the placenta; and between 10.0wt % and 60.0 of the pulp and/or extract of the pulp, preferably between 25.0 and 50.0wt % of the pulp.

In a preferred embodiment, the above mixtures/pastes have a moisture content of between 0.5 and 80% as a weight percentage of the paste, preferably between 20% and 70% and more preferably between 40% and 65%.

In a preferred embodiment, the mixture of step a. or step b., preferably a paste, has a protein content of greater than 2.0wt %, preferably greater than 2.5 wt %, preferably greater than 3.0wt % and preferably greater than 4.0wt %. In a preferred embodiment, the mixture of step a. or step b., preferably a paste, has a protein content of less than 15.0wt %, preferably less than 12.5 wt %, preferably less than 10.0wt % and preferably less than 8.0wt %. Preferably, from 2.0wt % to 15.0wt % or from 3.0wt % to 10.0wt %. The percentages referred to relate to the actual weight of the components, i.e. not on a dry basis.

On a dry weight basis, in a preferred embodiment, the mixture of step a. or step b., preferably a paste, has a protein content, of from 5.0wt % to 24.0wt %, preferably from 8.0wt % to 18.0wt % and preferably from 9.0wt % to 15.0wt %.

The protein content relates to non-treated and treated mixtures, i.e. all embodiments of the present invention.

In a preferred embodiment, the mixture produced in the present invention is treated to reduce the content of polysaccharides.

In a preferred embodiment, the mixture produced in the present invention is treated to increase the content of mono- and/or di-saccharides. This treatment preferably increases the sweetness of the mixture, preferably by increasing the amount of monosaccharides, in particular fructose and glucose, preferably glucose.

In an embodiment, the treatment steps mentioned above may be performed separately and individually or together. Either or both of these treatment steps may be carried out using an enzyme. In an embodiment, more than one enzyme may be used with optionally the enzymes providing a multitude of functionality.

The increase in sweetness is preferably provided by degradation of polysaccharides, preferably starch, cellulose, hemi-cellulose and/or pectins, that are present in the seeds, pulp/pulp extract and/or non-pulp and non-seed portion. The degradation is preferably achieved using enzymes.

In a preferred embodiment of the present invention, the treatment of the mixture comprises treatment with an enzyme that can use plant-polysaccharides as a substrate, preferably selected from enzymes including amylases, pectinases, cellulases, xylanases, proteases, preferably of the EC class 3 and 4 and combinations thereof.

In an embodiment of the present invention, the present invention preferably comprises an additional treatment with a glucose (xylose) isomerase enzyme (for example, E.C. 5.3.1.5).

The term polysaccharide relates to the dictionary definition of such polymers, i.e. a carbohydrate that consists of a number of molecules bonded together, preferably polysaccharides have greater than 8 saccharide units, greater than 10 units, or greater than 20 units and optionally less than 1000 units or less than 750 units.

The term encompasses both hetero- and homo-polysaccharides, linear and non-linear, for example.

In a preferred embodiment, the reduction in polysaccharide content means a degradation of the original polysaccharides, e.g. degradation of pectin, cellulose etc., into smaller polysaccharides, oligomers, and/or di/mono-saccharides. This degradation leads to a change in the molecular weight distribution of the polysaccharides, i.e. the molecular weight of the polysaccharides is lowered owing to the cleaving of the larger polysaccharides into smaller compounds.

In an embodiment, the mixture undergoes an enzyme treatment at between 10° C. and 80° C., for example the temperature for enzyme treatment is between 20° C. and 75° C., for example between 30° C. and 65° C., between 55° C. and 75° C. or between 30° C. and 55° C.

If multiple (i.e. at least two) enzyme treatment steps are used, the temperature may vary for each treatment step or remain constant.

In an embodiment, the mixture undergoes an enzyme treatment for between 10 minutes and 72 hours. For example, between 10 minutes and 60 hours, between 60 minutes and 50 hours, 100 minutes and 40 hours, or between 200 minutes and 35 hours.

In an embodiment, the mixture is treated with a mixture of enzymes between 1 hour and 7 hours, preferably between 2 hours and 5 hours.

If multiple (i.e. at least two) enzyme treatment steps are used, each of the individual steps may be carried out for the above time periods and/or the total treatment time is within the above time periods.

The amount of enzyme used is dependent on the format of the enzyme (e.g. powder, liquid etc.), activity of the enzyme and the composition of the mixture (e.g. moisture content, seeds content etc.). However, the amounts below are indicative of desired amounts.

In an embodiment, the amount of enzyme used is between 10 mg/L and 250 mg/L of the mixture, preferably between 25 mg/L and 200 mg/L, preferably between 50 mg/L and 150 mg/L.

In an embodiment, the amount of enzyme used is between 1.0 g/L and 200 g/L of the mixture, preferably between 2.0 g/L and 100 g/L, preferably between 5.0 g/L and 50 g/L.

In an embodiment, the amount of enzyme used is between 0.05 ml/kg and 200 ml/kg of the mixture, between 0.1 ml/kg and 200 ml/kg, between 1.0 ml/kg and 200 ml/kg, preferably between 2.0 ml/kg and 100 ml/kg, preferably between 5.0 ml/kg and 50 ml/kg and more preferably 5.0 ml/kg and 20 ml/kg or 0.1 ml/kg and 10 ml/kg.

In an embodiment, the amount of enzyme used is between 0.10% and 20% of the weight of the mixture, preferably between 0.20% and 10%, more preferably between 0.5% and 5.0%.

The above-amounts relate to individual enzymes or all enzymes present, i.e. the total amount of enzyme used, as applicable.

In an embodiment, the pulp or pulp extract is treated with a pectinase, for example EC 4.2.2.10 (CAS 9033-35-6), EC 3.2.1.15 (CAS 9032-75-1), EC 3.1.1.11 (CAS 9025-98-3), EC 4.2.2.9 or EC 4.2.2.2 (CAS 9015-75-2) and mixtures thereof.

Pectinases are classified in respect of: 1) pectin, pectic acid or oligo-D-galacturonate is the substrate; 2) is the cleavage random (endo-, liquefying or depolymerising enzymes) or endwise (exo- or saccharifying enzymes) and 3) whether they act by hydrolysis or trans elimination. In a preferred embodiment, the enzyme used is selected from the group consisting of pectin esterases, polymethylgalacturonases (exo- or endo), polygalacturonases (exo- or endo), polymethylgalacturonate lyases (exo- or endo), polygalacturonate lyases (exo- or endo) and protopectinases (e.g. endo-1.5-alpha-L-arabinanase) and mixtures thereof.

In an embodiment, the enzyme selection and reaction conditions may be optimised for the substrate to be treated. For example, it is well known that certain pectinases operate at their optimum at acidic pH and others at an alkaline pH (for example, see Table 2, Pectinases: Enzymes for fruit processing industry, International Food Research Journal 21(2): 447-453 (2014), which is incorporated by reference).

In an embodiment, the pectinase has an activity of between 0.50 U and 1.50 U per gram of pulp, for example between 0.75 U and 1.25 U per gram of pulp.

In an embodiment, the pectinase has an activity of between 5.0 U and 50.0 U per gram of pulp, for example between 10.0 U and 30.0 U per gram of pulp.

Where appropriate, the enzymes may have an activity of between 1000 PGNU/ml and 30000 PGNU/ml, between 2000 PGNU/ml and 10000 PGNU/ml, for example between 3000 PGNU/ml and 8500 PGNU/ml.

Where appropriate, the enzymes may have an activity of between 50 PTF and 500 PTF, for example between 60 PTF and 400 PTF.

Where appropriate, the enzymes may have a polygalacturonase activity of between 2000 and 20000 micromol/min/g, for example between 3000 and 12000 micromol/min/g.

The activities of the various pectinases that may be used in the present invention are defined by the recited known standards. Polygalacturonase unit (PGNU) is defined as the amount of enzyme which will produce 1 mg of galacturonic acid sodium salt under standard conditions (acetate buffer, pH 4.5, 40° C., 10 minute reaction time, 540 nm) and is given per ml of substrate or the amount of enzyme required to release one micromol of galacturonic acid from polygalacturonic acid per minute in acetate buffer, pH 4.5, 40° cand is given per ml or g of enzyme (preferably the latter method is used). Correspondingly, pectinesterase unit (PEU) activity is that amount of enzyme which consumes 1 micro equivalent of sodium hydroxide per minute under standard conditions (30° C., pH 4.5). Pectin lyase unit (PLU) is the quantity of enzyme that catalyses the split of bound endo alpha-1-4 galacturonosidyl (C6 Methyl ester) forming one micromole of delta-4,5 unsaturated product in one minute, according to the above conditions but at 45° C. and pH 5.5. PTF unit activity corresponds an enzyme activity, which leads to an increase of the extraction of 0.01 after 1 minute, at pH 5.8 and 30° C. at 235 nm in a 0.5% pectin solution.

In an embodiment of the invention, the enzyme used in a treatment process of the present invention is selected from the group consisting of Ultrazym® AFP-L (for example, from Novo Nordisk Ferment Ltd), Rohament® PL, Rohapect® TPL or PTF (AB Enzymes), Novozyme® 33095, Pectinex® Ultra AFP, UF, Ultra Colour or Ultra Clear (Novozymes A/S), Neopectinase PL1® (Novozymes A/S), pectin lyase 1A (Enzytech), Depol 793 (Biocatalyst), Rapidase® Fibre (DSM) and mixtures thereof, for example.

In an embodiment, the mixture is treated with a cellulase, for example EC 3.2.1.4, EC 3.2.1.91 or EC 3.2.1.21, or EC 3.2.1.99 and mixtures thereof.

The activity of the various cellulases that may be used in the present invention are defined by the recited known standards. One cellulase unit (U) is defined as the amount of enzyme that causes the release of 1.25 micromole of glucose equivalents per minute at pH 4.6 and 40° C.

One cellulolytic unit (ACU) is determined based upon the reduction of viscosity of a guar gum solution. In a preferred embodiment, the activity is between 400 and 3000 micromol/min/g, for example between 500 and 2500 micromol/min/g.

In an embodiment of the invention, the enzyme used in a treatment process of the present invention is selected from the group consisting of Cellulase 13L (Biocatalysts), Cellulase CE-3, Cellulase FG conc. (Enzyme Development Corporation), Cellulosin GMY (HBI Enzymes Inc.) and mixtures thereof, for example.

In an embodiment, the enzyme treatment may be carried out using at least two carbohydrases, optionally at least three carbohydrases, optionally at least four carbohydrases and optionally less than 20 carbohydrases or less than 10 carbohydrases.

In an embodiment, a mixture of enzymes is used with an activity of greater than 60 FBGU, optionally greater than 75 FBGU. Optionally, the activity is less than 180 FBGU, optionally less than 150 FBGU, and optionally less than 125 FBGU. For example, between 60 FBGU and 180 FBGU. One Fungal Beta-Glucanase Unit (FBGU) is the enzyme quantity which hydrolyzes fungal beta-glucan to reducing sugars corresponding to 1 µmol glucose per minute at pH 5.0 at 30° C.

In an embodiment, the pulp or pulp extract is treated with Viscozyme L (Novozymes A/S), which is a multi-enzyme complex containing a wide range of carbohydrases including arabanase, cellulase, beta-glucanase, hemicellulase, and xylanase. Within the scope of the present invention, Viscozyme L may be used to degrade the hemicellulose present.

Other enzymes that may be used within the meaning of include amylases (e.g. amyloglucosidase or glucoamylase or alpha-amylases, for example, Novozyme 26210, Amylase AD11MP and AMG 1100BG), proteases (Biobake CHW20 or CHW20 (also includes a xylanase) and Neutrase 1.5 MG).

In a highly preferred embodiment of the present invention, a mixture of enzymes that comprises at least one cellulase, at least one pectinase and at least one amylase.

In a highly preferred embodiment, the mixture of enzymes comprises a cellulase, a pectinase, an alpha-amylase and an amyloglucosidase.

In an embodiment, the total amount of enzyme mixture used is between 0.10% and 20% of the weight of the substrate (preferably the paste defined above), preferably between 0.20% and 10%, more preferably between 0.5% and 5.0%.

In a preferred embodiment, the amount of each individual enzyme is independently present in an amount of between between 0.025% and 5.0% of the weight of the substrates (preferably those defined above), preferably between 0.05% and 2.5%, more preferably between 0.1% and 1.25%.

Accordingly, in a highly preferred embodiment, the present invention utilises a mixture of enzymes that comprises at least one cellulase, at least one pectinase and at least one amylase, wherein the total amount of enzyme mixture used is between 0.10% and 20% of the weight of the substrate and the amount of each individual enzyme is independently present in an amount of between between 0.025% and 5.0% of the weight of the substrate.

In an embodiment of the present invention, provided is a dried mass, preferably an alternative to traditional cocoa mass/liquor, that comprises an increased sugar content. The sugar is preferably provided from the pulp, pulp extract, non-pulp and non-seed portion and/or the degradation of the seed/portion of the seed (e.g. degradation of starch and/or cellulose using enzymes in the seed).

In an embodiment, the sugar comprises monosaccharides (e.g. fructose, fucose, galactose, glucose and/or rhamnose), disaccharides (e.g. lactose, maltose and/or sucrose) and/or oligosaccharides (e.g. less than 20, less than 10 or less than 8 saccharide units) and it is here defined as "cocoa sugar". Preferred sugars present in the compositions of the present invention include sucrose, glucose or fructose and mixtures thereof. In a preferred embodiment, the sugar mixture of the present invention comprises at least 75 wt % based on the weight of the sugar mixture of a combination of glucose and fructose, preferably at least 80w % or at least 85 wt % or at least 90 wt %. In a preferred embodiment, the sugar mixture of the present invention comprises less than 100 wt % based on the weight of the sugar mixture of a combination of glucose and fructose, preferably less than 99.5 wt % or less than 99 wt % or less than 95 wt %. Preferably, between 75 wt % and 100 wt % or between 85 wt % and 99 wt %.

In an embodiment, the cocoa pulp extract sugar comprises sugars selected from the group consisting of glucose, sucrose and fructose and combinations thereof, and it is here defined as "cocoa sugar". The cocoa sugar may vary in content and nature based on the variety of the cocoa pod.

In a preferred embodiment, the above sugar contents are obtained using HPAEC-PAD (High-Performance Anion-Exchange Chromatography with Pulsed Amperometric Detection). A preferred analysis method is defined in the examples section.

In a preferred embodiment, the use of pulp and/or pulp extract provides insoluble and soluble dietary fibres to the mixture, as well as sugars and other solids. The insoluble dietary fibre comprises cellulose, hemicellulose or a combination thereof. In a preferred embodiment, the soluble dietary fibre comprises pectin.

The amount as a percentage of fibre is dependent on the moisture content of the pulp and the pulp extract.

In an embodiment, the pulp and extract of the pulp comprise as a weight percentage fibre (preferably pectin, hemicellulose and cellulose) between 0.75 and 50.0wt %, between 1.0 and 40 wt % or between 1.25 and 30 wt %. For example, between 0.75 and 7.5 wt % (e.g. high moisture content, pulp) or between 8.0 and 50.0wt % (e.g. lower moisture content, dried pulp or pulp extract). The polysaccharide reduction, preferably enzymatic, will reduce the amounts of these fibres in the mixture.

In a preferred embodiment, the seeds and/or portion of seeds provide starch and cellulose to the mixture, as well as other components. In an embodiment, the seeds and/or portion of seeds comprise between 2.5 and 30.0 wt % starch and cellulose combined, between 5.0 and 25.0 wt % and between 10.0 and 20.0wt %. The polysaccharide reduction, preferably enzymatic, will reduce the amounts of these components in the mixture.

In a preferred embodiment, the seeds and/or portion of seeds provide sugar, preferably mono- and di-saccharides as defined above, to the mixture, as well as other components. In an embodiment, the seeds and/or portion of seeds comprise between 0.25 and 10.0 wt % of such total sugars, between 0.5 and 5.0wt % and between 0.75 and 3.0wt %. The polysaccharide reduction, preferably enzymatic, will increase the amounts of these components in the mixture.

In a preferred embodiment, the average degree of polymerisation of the dietary fibre, preferably the insoluble and soluble components together, is greater than 12, preferably greater than 20, preferably greater than 30 and preferably greater than 40. In an embodiment, the average degree of polymerisation of the dietary fibre is less than 100, preferably less than 75. For example, between 40 and 75. In an embodiment, the average degree of polymerisation is obtained using SEC-MALS (Size Exclusion Chromatography—Multi Angle Light Scattering), for example, the sample was partially dissolved in DMSO.

As mentioned below, the reduction in the amount of polysaccharides by the treatment of the present invention breaks down larger polysaccharides into smaller polysaccharides, oligosaccharides (preferably 3-8 saccharides or 3-10 saccharides), and/or di/mono-saccharides.

In an embodiment, the total dietary fiber, and its fractions, in the mixture is measured by the enzymatic-gravimetric method, Rapid Integrated Total Dietary Fiber method as described in Journal of AOAC International, Volume 102, Number 1, January-February 2019, pp. 196-207(12).

In an embodiment of the present invention, the cocoa pulp extract is prepared by a process that comprises removing the cocoa pulp from the cocoa pod, thermally treating, optionally concentrating, and drying the cocoa pulp.

In an embodiment, the cocoa pulp is removed from the cocoa pod, for example, by the process of EP0442421 (Nestle SA). An alternative means of removing the cocoa pulp from the cocoa pods in an embodiment of the present invention is the use of a commercially available pulper, preferably fitted with brushes.

The seeds may be obtained by the generally known methods in the art. The seeds may retain some pulp from the fruit or maybe recombined with the pulp and/or pulp extract as appropriate.

Similarly, for the non-seed/non-pulp portion.

The components for use in preparing the mixture of the present invention are preferably pasteurised, preferably once mixed together but may be treated separately.

In the above embodiment, the thermal treatment step relates to treatment at high temperatures (typically 120° C. to 160° C.) for a very short period (typically no more than 200 seconds and optionally typically more than 50 seconds) to deactivate any microbial contaminants to make the ingredient safe for human consumption. Alternatively, different temperatures may be used, for example, 60° C. to 100° C., and different times, for example 10 to 120 seconds. The thermal treatment step is not particularly limited, as long as pasteurisation occurs without product degradation.

Whilst it is preferable to process the cocoa pulp when fresh, in an embodiment, once depulped the cocoa pulp may be frozen to ensure freshness prior to subsequent treatment. This freezing may be carried out by standard equipment for freezing vegetable and fruit matter known in the art. If freezing is used at any point in the process of the present invention, the pulp or pulp extract is preferably subsequently defrosted prior to incorporation into the product of the invention.

In an embodiment, the treatment to reduce the polysaccharide content and/or to modify the viscosity may be done mechanically or physically, for example by centrifugation, preferably in a decanting centrifuge. This treatment may be used to remove polysaccharides present in the pulp.

In an embodiment, the above ratios are based on a solids content of the pulp or pulp extract of between 10% and 75%, preferably for cocoa pulp of between 10% and 20% total solids content.

In an embodiment, the mixture is treated to increase the pH, for example, the mixture is treated with an alkaline salt or base. The nature of the compound is not particularly limited, but is preferably a food-grade compound. In a preferred embodiment, the cocoa pulp is treated with compound such as mono-/di-/tri-sodium-/potassium-/calcium-phosphates, mono-/di-ammonium phosphate, sodium hydroxide, calcium hydroxide, potassium hydroxide, sodium carbonate, calcium carbonate, or potassium carbonate and mixtures thereof in order to increase the pH.

In an embodiment, the alkaline salt or base is combined with the mixture at an amount of greater than 0.10wt % of the mixture preferably greater than 0.15 wt % and preferably greater than 0.20 wt %. In an embodiment, the alkaline salt or base is combined with the pulp or pulp extract at an amount of less than 1.25 wt % of the pulp or pulp extract, preferably less than 1.0wt % and preferably less than 0.90 wt %, for example between 0.10 wt % and 1.25 wt %, between 0.20 wt % and 0.90 wt % or between 0.25 wt % and 0.85 wt %.

In an embodiment, as mentioned above, the pH of the cocoa pulp is increased to be higher than the range of 2.75-4.0, optionally greater than 3.3-4.0 or 3.0-3.7 (all measured at 20° C.), for example, the pH is increased to be greater than 4.5, greater than 5.0, greater than 5.5 or greater than 6.0. For example, the pH is increased but is not increased to be greater than 8.0, not greater than 7.5 or not greater than 7.0 or not greater than 6.5 or not greater than 6.0.

In a preferred embodiment, the agent to increase the pH is added as an aqueous solution or slurry to the mixture. In a preferred embodiment, the concentration of the agent in water is between 5 g/100 ml and 100 g/100 ml or between 5 g/100 ml and 50 g/100 ml, preferably between 10 g/100 ml and 30 g/100 ml. Preferably by adding the agent as an aqueous solution or slurry, undesired gelling does not occur which may increase viscosity of the pulp when higher concentrations of agent are added.

In an embodiment, the enzymatic treatment is carried out after the treatment to increase the pH. In an alternative embodiment, the enzymatic treatment is carried out before the pH treatment.

In an embodiment, the enzymatic treatment is carried out when the pH of the pulp is between 3.3 and 6.0, preferably between 4.25 and 5.0.

In an alternative embodiment, the pH treatment is carried out using dialysis (ion exchange). For example, using the processes disclosed in EP0049497 (Nestle SA).

The present invention provides advantageous properties in respect of a reduction, or entire removal, of added sugar, with the sweetness being provided from a natural source, that also contains other components of the cocoa pod that contribute to the flavour of the chocolate.

In respect of added sugar, in an embodiment, the term "added sugar" refers to refined sugar, which encompasses processed sugars, e.g. white or brown sugars, which have their standard nutritional definitions. Preferably, as recited in Regulation (EC) No 1924/2006, the present invention relates to chocolate products where sugars have not been added and the product does not contain any added mono- or disaccharides or any other food used for its sweetening properties other than sugars that are inherently naturally present in the ingredients.

Accordingly, the present invention provides an alternative for added sugars by providing naturally occurring sugars that are present in the source of cocoa mass, cocoa butter and/or cocoa powder. Thus, the present invention provides a non-added sugar chocolate product containing natural sugar.

Fermentation

The fermentation step of the present invention may be carried out using appropriate methods.

In an embodiment, the fermentation is selected from the group consisting of natural fermentation, controlled fermentation open or controlled fermentation submerged, as well as combinations of these processes.

In an embodiment, the *Theobroma* genus pods are unfermented, under-fermented or fermented. In an embodiment, the above terms may be defined as follows.

In an embodiment, the duration of fermentation is up to 10 days, for example between 2 and 8 days. Fermentation is normally performed between 2 and 6 days, depending on the variety, origin and what flavour is to be delivered.

Unfermented means no intentional fermentation occurs and under fermented is less than 2 days of fermentation.

The fermentation is preferably carried out on the paste prepared in the present invention.

In an embodiment, the fermentation is natural fermentation and utilises yeasts, acetic acid bacteria and/or lactic acid bacteria of the local environment (e.g. present in the paste, present in the ambient air environment etc.). In an embodiment, the temperature profile of the fermentation remains uncontrolled and is influenced by the stage of the fermentation. In an embodiment, the fermentation paste is spread out and turned/mixed in regular intervals as appropriate to ensure full fermentation.

In an embodiment, the fermentation is controlled fermentation, open. The fermentation is preferably controlled by addition of specifically selected strains of yeasts, acetic acid bacteria and/or lactic acid bacteria. The choice of additive may be determined depending on the stage of fermentation and may be used in combination with initial steps of natural fermentation. In an embodiment, the temperature profile of the fermentation is controlled to the optimal growth conditions of the selected microorganism. In an embodiment, acid regulators may be added to improve the fermentation efficiency of each step according to the selected microorganism. In an embodiment, the fermentation paste is spread out and turned/mixed in regular intervals as appropriate to ensure full fermentation. Alternatively, a fixed bed reactor may be used.

In an embodiment, the fermentation is controlled fermentation, submerged. In an embodiment, the mixture is fermented inside a closed bioreactor vessel (for example, a stirring tank)

The fermentation is preferably controlled by addition of specifically selected strains of yeasts, acetic acid bacteria and/or lactic acid bacteria. The choice of additive may be determined depending on the stage of fermentation and may be used in combination with initial steps of natural fermentation. In an embodiment, the temperature profile of the fermentation is controlled to the optimal growth conditions of the selected microorganism. In an embodiment, acid regulators may be added to improve the fermentation efficiency of each step according to the selected microorganism.

In this embodiment, fermentation duration is up to 10 days but preferably up to 96 hours or up 72 hours or up 48 hours. In an embodiment, during fermentation the fermentation paste is stirred continuously. In an embodiment, during the aerobic phase of the fermentation oxygen or compressed air is preferably added to the fermentation mix.

Fermentation may be carried out at standard temperatures, for example, between 2° and 75° C., between 24 and 72° C. or between 2° and 55° C. The fermentation may be controlled to be anaerobic or aerobic as necessary.

In an embodiment, starter cultures as known in the art may be used to commence fermentation.

In an alternative embodiment, the seeds and/or portion of seeds are fermented prior to combination with the other components of the invention. The mixture may then undergo further fermentation or no further fermentation.

In an alternative embodiment, the chocolate products of the invention are non-roasted. Non-roasted denotes the composition is produced by a non-roasting process in which the cocoa-solid components thereof (such as cocoa beans, nibs and the like) are not subject to a high temperature (140° C. or higher, or 120° C. or higher, for example) for a lengthy time (for example, 30 minutes or more). Without wishing to be bound by any mechanism it is believed that in a non-roasting process the conditions are either insufficiently high in temperature (preferably below 120° C., more preferably less than or equal to 110° C., even more preferably less than or equal to 100° C., most preferably less than or equal to 90° C., for example less than or equal to 80° C.) and/or of sufficiently short duration (preferably less than 30 minutes, more preferably less than 20 minutes, even more preferably less than 10 minutes, most preferably less than 5 minutes, for example less than 4 minutes) so undesired chemical reactions such as the Maillard reaction are not allowed to develop to any great extent and thus significant amounts of flavour active compounds are not generated which might otherwise impart strong roasted notes to the composition. A roasting process or step is to be distinguished from treatments such as flash heating where raw ingredients such as cocoa beans and/or nibs may be treated at high temperatures (typically 1200 to 160° C.) for a very short period (typically no more than 200 seconds) to deactivate any microbial contaminants to make the ingredient safe for human consumption. Such anti-microbial and/or de-bacterising treatments and/or steps are still considered within the scope of a non-roasting process.

Liquor/Mass Production

The present invention provides new compositions that are alternatives to traditional cocoa-based masses and liquors.

Accordingly, the present invention may provide an alternative to traditional cocoa mass/liquor where the seeds or portion of seeds have been fermented or not.

Similarly, the seeds and/or portion of seeds are unroasted or roasted prior to combination with the other components of the invention. The mixture may then undergo roasted or additional roasting in the drying step to provide the dried mass of the present invention.

Hence, the process of the present invention provides the following embodiments.

A process comprising:
combining pulp with seeds and/or a portion of the seeds to form a mixture, grinding the mixture to reduce the particle size and form a paste, and drying, and optionally roasting, the paste to form a dried mass.

A process comprising:
combining pulp with seeds and/or a portion of the seeds to form a mixture, grinding the mixture to reduce the particle size and form a paste, fermenting the paste, drying, and optionally roasting, the paste to form a dried mass.

In a preferred embodiment, the mixture also comprises the non-pulp and non-seed portion of the fruit, for example, comprising funicle, placenta, endocarp, mesocarp and/or endocarp, particularly preferable the placenta.

In a preferred embodiment, the dried mass has a sugar content, preferably a mono- and di-saccharide content, of greater than 8.0wt %, preferably greater than 10.0wt %, preferably greater than 12.0wt % and preferably greater than 14.0wt %. In a preferred embodiment, the paste has a sugar content, preferably a mono- and di-saccharide content, of less than 35.0wt %, preferably less than 30.0wt %, preferably less than 27.5 wt % and preferably less than 25.0wt %. Preferably, from 8.0wt % to 35.0wt % or from 12.0wt % to 25.0wt %. The percentages referred to relate to the actual weight, i.e. including any moisture present.

In a preferred embodiment, the dried mass has a total dietary fibre content, i.e. insoluble and soluble, of greater than 2.0wt %, preferably greater than 3.0wt %, preferably greater than 4.0wt % and preferably greater than 5.0wt %. In a preferred embodiment, the paste has a total dietary fibre content, i.e. insoluble and soluble, of less than 40.0wt %, of less than 35.0wt %, of less than 30.0wt %, of less than 20.0wt %, of less than 18.0wt %, preferably less than 16.0wt %, preferably less than 14.0wt % and preferably less than 13.5 wt %. Preferably, from 2.0wt % to 40.0wt %, from 2.0wt % to 18.0wt % or from 4.0wt % to 14.0wt %. The percentages referred to relate to the actual weight, i.e. including any moisture present.

In a preferred embodiment, the upper end of the above ranges relates to non-treated (preferably non-enzyme treated masses), i.e. between 20.0wt % and 40.0wt %, 22.5 wt % and 35.0wt %, and the lower end relates to treated masses, i.e. between 2.0wt % and 18.0wt %. The treatment reduces the total dietary fibre content.

In a preferred embodiment, the dried mass has a fat content of greater than 18.0wt %, preferably greater than 20.0wt %, preferably greater than 22.0wt % and preferably greater than 25.0wt %. In a preferred embodiment, the paste has a fat content, of less than 50.0wt %, preferably less than 45.0wt %, preferably less than 40.0wt % and preferably less than 35.0wt %.

Preferably, from 18.0wt % to 50.0wt % or from 22.0wt % to 40.0wt %. The percentages referred to relate to the actual weight, i.e. including any moisture present.

Accordingly, in a highly preferred embodiment, the present invention provides a dried mass that comprises:
a sugar content, preferably a mono- and di-saccharide content, from 8.0wt % to 35.0wt %,
a fat content of from 18.0wt % to 50.0wt %, and
a moisture content of from 0.1 wt % to 10.0wt %.

In a further highly preferred embodiment, the present invention provides a dried mass that comprises:
a sugar content, preferably a mono- and di-saccharide content, from 12.0wt % to 25.0wt %,
a fat content of from 18.0wt % to 50.0wt %, and
a moisture content of from 0.1 wt % to 5.0wt %.

Accordingly, in a highly preferred embodiment, the present invention provides a dried mass that comprises:

a sugar content, preferably a mono- and di-saccharide content, from 8.0wt % to 35.0wt %, a total dietary fibre content from 2.0wt % to 18.0wt % (preferably treated) or a total dietary fibre content from 20.0wt % to 40.0wt % (preferably non-treated) and a moisture content of from 0.1 wt % to 10.0wt %.

In a further highly preferred embodiment, the present invention provides a dried mass that comprises:

a sugar content, preferably a mono- and di-saccharide content, from 12.0wt % to 25.0wt %, a total dietary fibre content from 4.0wt % to 14.0wt % (preferably treated) or a total dietary fibre content from 20.0wt % to 35.0wt % (preferably non-treated), and a moisture content of from 0.1 wt % to 5.0wt %.

Accordingly, in a highly preferred embodiment, the present invention provides a dried mass that comprises:

a sugar content, preferably a mono- and di-saccharide content, from 8.0wt % to 35.0wt %, a total dietary fibre content from 2.0wt % to 18.0wt % (preferably treated) or a total dietary fibre content from 20.0wt % to 40.0wt % (preferably non-treated), a fat content of from 18.0wt % to 50.0wt %, and a moisture content of from 0.1 wt % to 10.0wt %.

In a further highly preferred embodiment, the present invention provides a dried mass that comprises:

a sugar content, preferably a mono- and di-saccharide content, from 12.0wt % to 25.0wt %, a total dietary fibre content from 4.0wt % to 14.0wt % (preferably treated) or a total dietary fibre content from 20.0wt % to 35.0wt % (preferably non-treated), a fat content of from 18.0wt % to 50.0wt %, and a moisture content of from 0.1 wt % to 5.0wt %.

In a preferred embodiment, the dried mass has a protein content of greater than 5.0wt %, preferably greater than 7.5 wt %, preferably greater than 9.0wt % and preferably greater than 10.0wt %. In a preferred embodiment, the dried mass has a protein content of less than 22.0wt %, preferably less than 20.0wt %, preferably less than 17.5 wt % and preferably less than 15.0wt %. Preferably, from 5.0wt % to 22.0wt % or from 9.0wt % to 17.5 wt %. The percentages referred to relate to the actual weight, i.e. including any moisture present.

In an embodiment, the drying is preferably carried out using spray drying, vacuum drying, drum drying, oven-drying, foam drying, tray drying, fluid bed drying, crystallization drying (preferably using a seed crystal of sugar), roller-drying or freeze-drying (lyophilization).

In an embodiment, the drying takes place at greater than 45° C., preferably greater than 50° C. preferably greater than 55° C. and greater than 60° C. In an embodiment, the drying takes place at less than 125° C., preferably less than 100° C., preferably less than 90° C. and preferably less than 85° C. or less than 80° C. In a preferred embodiment, the drying takes place between 45° C. and 100° C. and more preferably between 45° C. and 85° C.

In an embodiment, the drying takes place for greater than 1 hour, preferably greater than 5 hours, preferably greater than 10 hours, greater than 15 hours or greater than 20 hours. In an embodiment, the drying takes place for less than 100 hours, preferably less than 72 hours, preferably less than 60 hours, preferably less than 50 hours or less than 40 hours. In a preferred embodiment, the drying takes place between 45° C. and 125° C. and between 1 hour and 72 hours. Preferably, the above ranges relate to oven-drying, optionally with- or without-vacuum.

In an embodiment of the present invention, the dried mass comprises less than 10.0% by weight of water, preferably less than 8.0%, more preferably less than 5.0%, more preferably less than 3.0%, and more preferably less than 2.0%. In an embodiment, it noted that entire dehydration is potentially not achievable, thus, the water content is optionally greater than 0.1%, greater than 0.5% or greater than 1.0%. In a preferred embodiment, the water contents above may be measured using Karl Fischer analysis as specified above or a halogen analyser weight loss in an oven, 5 g sample for 5 hours at 102° C. as used in the examples below.

In an embodiment, an additional roasting step may be present, preferably when the mixture of the present invention is fermented and/or enzyme treated.

In an embodiment, the roasting takes place at greater than 85° C., preferably greater than 100° C., preferably greater than 105° C., preferably greater than 125° C. and greater than 150° C.

In an embodiment, the roasting takes place at less than 225° C., preferably less than 210° C., preferably less than 200° C. and preferably less than 195° C. or less than 180° C. In a preferred embodiment, the roasting takes place between 85° C. and 225° C. and more preferably between 125° C. and 200° C. or between 100° C. and 150° C.

In an embodiment, the roasting takes place for greater than 10 minutes, preferably greater than 20 minutes, or preferably greater than 30 minutes. In an embodiment, the roasting takes place for less than 2 hours, preferably less than 1.5 hours, and preferably less than 1 hour.

In a preferred embodiment, the roasting takes place between 85° C. and 225° C. and between 10 minutes and 2 hours.

When roasting is present the moisture content is further reduced when drying is used alone. In a preferred embodiment, the roasted moisture content is at the lower end of the range specified above, e.g. 0.1% to 5.0% or 0.5% to 3.5% or 1.0% to 3.0%.

Accordingly, in a highly preferred embodiment, the present invention provides a dried mass that is combined with other ingredients in chocolate-products (e.g. sugar, cocoa butter, and/or milk-based ingredients) to provide an alternative chocolate-product to those presently known. The dried mass of the present invention is an alternative to the traditionally used cocoa mass/liquor.

Chocolate Product and Chocolate-Like Products

General Products of the Invention

The present invention provides new chocolate products and chocolate-like products comprising the materials of the present invention.

The term "chocolate-like" encompasses products where the components traditionally provided from the cocoa-plant are replaced by analogous materials produced from other plants in the *Theobroma* genus prepared by the method of the present invention.

The material of the present invention provides an alternative to traditional cocoa mass/liquor, as well as preferably a portion of the added sugar typically used in chocolate manufacture.

In an embodiment, compositions of the invention may usefully be chocolate products (as defined herein), more usefully be chocolate or a chocolate compound. Independent of any other legal definitions that may be used compositions of the invention that comprises a cocoa solids content of from 25% to 35% by weight together with a milk ingredient (such as milk powder) may be informally referred to herein as 'milk chocolate' (which term also encompasses other analogous chocolate products, with similar amounts of cocoa-solids or replacements therefor). Independent of any other legal definitions that may be used compositions of the invention that comprises a cocoa solids content of more than 35% by weight (up to 100% (i.e. pure cocoa solids) may be informally referred to herein as 'dark chocolate' (which term also encompasses other analogous chocolate products, with similar amounts of cocoa-solids or replacements therefor).

The term 'chocolate' as used herein denotes any product (and/or component thereof if it would be a product) that meets a legal definition of chocolate in any jurisdiction and also include product (and/or component thereof) in which all or part of the cocoa butter (CB) is replaced by cocoa butter equivalents (CBE) and/or cocoa butter replacers (CBR).

The term 'chocolate compound' as used herein (unless the context clearly indicates otherwise) denote chocolate-like analogues characterized by presence of cocoa solids (which include cocoa liquor/mass, cocoa butter and cocoa powder) in any amount, notwithstanding that in some jurisdictions compound may be legally defined by the presence of a minimum amount of cocoa solids.

The term 'chocolate product' as used herein denote chocolate, compound and other related materials that comprise cocoa butter (CB), cocoa butter equivalents (CBE), cocoa butter replacers (CBR) and/or cocoa butter substitutes (CBS). Thus, chocolate product includes products that are based on chocolate and/or chocolate analogues, and thus for example may be based on dark, milk or white chocolate.

Unless the context clearly indicates, otherwise it will also be appreciated that in the present invention, any one chocolate product may be used to replace any other chocolate product and neither the term chocolate nor compound should be considered as limiting the scope of the invention to a specific type of chocolate product. Preferred chocolate product comprises chocolate and/or compound, more preferred chocolate product comprises chocolate, most preferred chocolate product comprises chocolate as legally defined in a major jurisdiction (such as Brazil, EU and/or US).

The term 'choco-coating' as used herein (also refers to a 'choco-shell') denotes coatings made from any chocolate product. The terms 'chocolate coating' and 'compound coating' may be defined similarly by analogy. Similarly the terms 'choco-composition, (or mass)', 'chocolate composition (or mass)' and 'compound composition (or mass)' denote compositions (or masses) that respectively comprise chocolate product, chocolate and compound as component(s) thereof in whole or part. Depending on their component parts the definitions of such compositions and/or masses may of course overlap.

The term 'chocolate product confectionery as used herein denotes any foodstuff which comprises chocolate product and optionally also other ingredients and thus may refer to foodstuffs such confections, wafers, cakes and/or biscuits whether the chocolate product comprises a choco-coating and/or the bulk of the product. Chocolate product confectionery may comprise chocolate product in any suitable form for example as inclusions, layers, nuggets, pieces and/or drops. The confectionery product may further contain any other suitable inclusions such as crispy inclusions for example cereals (e.g. expanded and/or toasted rice) and/or dried fruit pieces.

The chocolate product of the invention may be used to mould a tablet and/or bar, to coat confectionery items and/or to prepare more complex confectionery products. Optionally, prior to its use in the preparation of a chocolate product confectionery product, inclusions according to the desired recipe may be added to the chocolate product. As it will be apparent to a person skilled in the art, in some instances the product of the invention will have the same recipe and ingredients as the corresponding composition and/or mass while in other instances, particularly where inclusions are added or for more complex products, the final recipe of the product may differ from that of the composition and/or mass used to prepare it.

In one strongly preferred embodiment of the invention, the chocolate product confectionery product comprises a substantially solid moulded choco-tablet, choco-bar and/or baked product surrounded by substantial amounts of chocolate product. These products are prepared for example by substantially filling a mould with chocolate product and optionally adding inclusions and/or baked product therein to displace chocolate product from the mould (so-called wet shelling processes), if necessary further topping up the mould with chocolate product. For such strongly preferred products of the invention the chocolate product forms a substantial or whole part of the product and/or a thick outside layer surrounding the interior baked product (such as a wafer and/or biscuit laminate). Such solid products where a mould is substantially filled with chocolate are to be contrasted with products that comprise moulded thin chocolate shells which present different challenges. To prepare a thin-coated chocolate shell a mould is coated with a thin layer of chocolate, the mould being inverted to remove excess chocolate and/or stamped with a cold plunger to define the shell shape and largely empty the mould. The mould is thus coated with a thin layer of chocolate to which further ingredients and fillings may be added to form the interior body of the product.

Unless the context herein clearly indicates, otherwise it will also be well understood by a skilled person that the term chocolate product confectionery as used herein can readily be replaced by and is equivalent to the term chocolate confectionery as used throughout this application and in practice these two terms when used informally herein are interchangeable. However, where there is a difference in the meaning of these terms in the context given herein, then chocolate confectionery and/or compound confectionery are preferred embodiments of the chocolate product confectionery of the present invention, a preferred embodiment being chocolate confectionery.

Preferred chocolate product confectionery may comprise one or more -ingredients, for example selected from the group consisting of: chocolate product(s), compound product(s), chocolate coating(s) and/or compound coating(s). The products may comprise uncoated products such as choco-bar(s) and/or choco-tablet(s) with or without inclusions and/or products coated with chocolate product such as coated biscuits, cakes, wafers and/or other confectionery items. More preferably and/or alternatively any of the aforementioned may comprise one or more cocoa butter replacer(s) (CBR), cocoa-butter equivalent(s) (CBE), cocoa-butter substitute(s) (CBS) and/or any suitable mixture(s) thereof.

In chocolate product confectionery, the cocoa butter (CB) may be replaced by fats from other sources. Such products may generally comprise one or more fat(s) selected from the group consisting of: lauric fat(s) (e.g. cocoa butter substitute (CBS) obtained from the kernel of the fruit of palm trees); non-lauric vegetable fat(s) (e.g. those based on palm or other specialty fats); cocoa butter replacer(s) (CBR); cocoa butter equivalent(s) (CBE) and/or any suitable mixture(s) thereof. Some CBE, CBR and especially CBS may contain primarily saturated fats and very low levels of unsaturated omega three and omega six fatty acids (with health benefits). Thus in one embodiment in chocolate product confectionery of the invention such types of fat are less preferred than CB.

One embodiment of the invention provides a multi-layer product optionally comprising a plurality of layers of baked foodstuff (preferably selected from one or more wafer and/or biscuit layers, and/or one or more fillings layers there between with at least one coating layer located around these layers foodstuff, the coating comprising a chocolate product of or prepared according to the invention.

A further embodiment of the invention provides a chocolate product confectionery product, further coated with chocolate (or equivalents thereof, such as compound) for example a praline, chocolate shell product and/or chocolate coated wafer or biscuit any of which may or may not be layered. The chocolate coating can be applied or created by any suitable means, such as enrobing or moulding. The coating may comprise a chocolate product of or prepared according to the invention.

Another embodiment of the invention provides a chocolate product confectionery product of and/or used in the present invention, that comprises a filling surrounded by an outer layer for example a praline, chocolate shell product.

In another preferred embodiment of the invention the foodstuff comprises a multi-layer coated chocolate product comprising a plurality of layers of wafer, chocolate product, biscuit and/or baked foodstuff, with filling sandwiched between them, with at least one layer or coating being a chocolate product (e.g. chocolate) of the invention. Most preferably the multi-layer product comprises a chocolate product confectionery product (e.g. as described herein) selected from sandwich biscuit(s), cookie(s), wafer(s), muffin(s), extruded snack(s) and/or praline(s). An example of such a product is a multilayer laminate of baked wafer and/or biscuit layers sandwiched with filling(s) and coated with chocolate.

Baked foodstuffs used in the invention may be sweet or savoury. Preferred baked foodstuffs may comprise baked grain foodstuffs which term includes foodstuffs that comprise cereals and/or pulses. Baked cereal foodstuffs are more preferred, most preferably baked wheat foodstuffs such as wafer(s) and/or biscuit(s). Wafers may be flat or shaped (for example into a cone or basket for ice-cream) and biscuits may have many different shapes, though preferred wafer(s) and/or biscuit(s) are flat so they can be usefully be laminated together with a confectionery filling of the invention (and optionally a fruit based filling). More preferred wafers are non-savoury wafers, for example having a sweet or plain flavour. A non-limiting list of those possible baked foodstuffs that may comprise chocolate compositions that comprise chocolate product of and/or used in the present invention are selected from: high fat biscuits, cakes, breads, pastries and/or pies; such as from the group consisting of: ANZAC biscuit, biscotti, flapjack, kurabiye, lebkuchen, leckerli, macroon, bourbon biscuit, butter cookie, digestive biscuit, custard cream, extruded snacks, florentine, garibaldi gingerbread, koulourakia, kourabiedes, Linzer torte, muffin, oreo, Nice biscuit, peanut butter cookie, polvorón, pizzelle, pretzel, croissant, shortbread, cookie, fruit pie (e.g. apple pie, cherry pie), lemon drizzle cake, banana bread, carrot cake, pecan pie, apple strudel, baklava, berliner, bichon au citron and/or similar products.

Preferably the chocolate product of or prepared according to the invention may be suitable for use as (in whole or in part as a component) of one or more coatings and/or fillings.

The coating and/or filling may comprise a plurality of phases for example one or more solid and/or fluid phases such as fat and/or water liquid phases and/or gaseous phases such as emulsions, dispersions, creams and/or foams.

Therefore, broadly a further aspect of the invention comprises a chocolate product as described herein.

A yet further aspect of the invention broadly comprises use of a chocolate product of or prepared according to the invention as a chocolate product confectionery product and/or as a filling and/or coating for a foodstuff of the invention as described herein.

Specific Products of the Invention

In an embodiment of the present invention, the presence of the alternative to cocoa mass affords a chocolate product or chocolate-like product that is distinguished over previously known chocolate products.

The "mass" of the present invention is the dried product of the processes of this invention.

In an embodiment, the chocolate product comprises between 0.5% and 95% by weight of the chocolate product of the mass of the present invention dependent on the end product, preferably between 5% and 85%, for example, between 45% and 80%, less than 5% or between 8% and 20% by weight of the chocolate product of the mass.

In an embodiment of the present invention, the mass of the present invention is the main source of cocoa mass/liqour in the chocolate product, preferably chocolate, preferably the mass constitutes over 60% by weight of the cocoa mass/liqour in the chocolate product, preferably chocolate, preferably over 75%, more preferably over 80%, more preferably over 85%, more preferably over 90%, more preferably over 95% and more preferably 100%.

In an embodiment, the chocolate product comprises between 0% and 35% by weight of the chocolate product of cocoa butter dependent on the end product, preferably between 0% and 30%, for example, between 6% and 20%, less than 5% or between 20% and 35% by weight of the chocolate product of cocoa butter. In an embodiment, the addition of cocoa butter is independent of any present in the cocoa mass.

In an embodiment of the present invention, the chocolate product, preferably chocolate, comprises between 5% and 65% by weight of the chocolate product, preferably chocolate, of sugar, preferably between 10% and 65%, more preferably between 15% and 60%, more preferably between 20% and 60%, for example between 20% and 55%, 20% and 40%, 34% to 58% or 37% to 50%.

Hence, in a preferred embodiment, the present invention provides a chocolate product comprising:

between 0.5% and 95% by weight of the chocolate product of the mass of the present invention, between 0% and 35% by weight of the chocolate product of cocoa butter, between 5% and 65% by weight of the chocolate product of sugar, preferably the mass of the present invention is the main source of cocoa mass/liqour in the chocolate product, preferably chocolate, preferably the mass constitutes over 60% by weight of the cocoa mass/liquor.

In an embodiment, the sugar may be sucrose. Alternatively, a portion or all of the sugar may be the dried pulp or dried extract of pulp provided by the processes described in WO2019115731, WO2019115735 and WO2019149909.

In an embodiment of the present invention, the chocolate product is selected from the group consisting of milk chocolate and dark chocolate.

In an embodiment, the composition consists essentially of cocoa mass and cocoa pulp extract or consist essentially of cocoa mass and dried cocoa pulp.

In this invention, the term "consists essentially" of means at least 95.0wt %, more preferably at least 97.5 wt %, more preferably at least 98.0wt % and more preferably at least 99.0wt %, preferably up to and including 100.0wt %.

In an embodiment, the present invention provides a chocolate that consists of the mass of this invention and cocoa pulp extract.

Accordingly, the present invention provides a method comprising the steps of:

combing the dried mass of the present invention with at least one other ingredient present in chocolate products, preferably sugar and/or cocoa butter, preferably refining the combination prepared, preferably adding other ingredients present in a chocolate product, and preferably conching the combination.

In an embodiment, the composition further comprises at least one component selected from the group consisting of a flavoring, milk-based component, an emulsifier, cocoa butter and an additional sugar, preferably at least one component selected from the group consisting of a milk-based component, an emulsifier, and cocoa butter.

In an embodiment, the composition further comprises at least one component selected from the group consisting of a milk-based component, an emulsifier and cocoa butter, preferably at least one component selected from the group consisting of a milk-based component, an emulsifier, and cocoa butter.

In an embodiment, if cocoa butter is used in addition to the mass of the invention, the additional cocoa butter is used in an amount of less than 25% by weight of the chocolate product composition, preferably less than 20% by weight and preferably greater than 2.5% by weight, preferably greater than 5.0% by weight, for example between 2.5% and 25%.

In an embodiment of the present invention, the milk-based component is selected from the group consisting of non-fat milk solids, milk powder (optionally full cream, skimmed or semi-skimmed) and milk fat. In an embodiment, the milk products may be spray dried within the standard parameters for the production of these known products.

In an embodiment of the present invention, the chocolate product, preferably chocolate, comprises between 0% and 60% by weight of the chocolate product, preferably chocolate, of milk-based components, preferably between 0% and 50%, more preferably between 15% and 60%, more preferably between 20% and 60%, for example between 20% and 55%, 22% and 50%, or 25% and 40%.

Hence, in a preferred embodiment, the present invention provides a chocolate product comprising:

between 0.5% and 95% by weight of the chocolate product of the mass of the present invention, between 0% and 35% by weight of the chocolate product of cocoa butter, between 5% and 65% by weight of the chocolate product of sugar, between 0% and 60% by weight of the chocolate product, preferably chocolate, of milk-based components, and preferably the mass of the present invention is the main source of cocoa mass/liqour in the chocolate product, preferably chocolate, preferably the mass constitutes over 60% by weight of the cocoa mass/liquor.

In an embodiment, the emulsifier is selected from the group consisting of lecithin, polyglycerol polyricinoleate and ammonium phosphatide. In an embodiment, the amount of emulsifier may be between 0.05 and 1.0% by weight of the composition, preferably between 0.1% and 0.5%.

Alternatively, an emulsifier may not be present.

In an embodiment, the flavoring may be any that is typically used in chocolate manufacture, for example, vanilla-based/extract (e.g. vanillin) or hazelnut-based/extract (e.g. hazelnut paste or oil).

In an embodiment, the composition comprises inclusions. The inclusions may be any that are commonly used in the art, for example, fruit-based inclusions, nut-based inclusions, cereal-based inclusions and yogurt-based inclusions, for example. The inclusions may take the form of those commonly used, for example chips, flakes etc. The inclusions may be present in an amount of from 2.5% to 25% based on the weight of the chocolate product.

Specific, non-limiting chocolate recipes are now described. In all embodiments below, the percentages relate to wt % of the total chocolate product.

In an embodiment, the chocolate product composition comprises:

45-80% of the mass of the present invention 10-55% of a sugar source 0-15% of cocoa butter 0.0-1.0% or 0.5% of lecithin In an embodiment, the chocolate product composition comprises:

8-25% of the mass of the present invention 25-58% of a sugar source, 10-25% of cocoa butter 0.0-6.5% of milk fat 15-40% of milk powder 0.0-1.0% or 0.5% of lecithin The present invention may thus provide a chocolate product from one source, i.e. cocoa pods, or a chocolate product that uses the compositions of the present invention and other traditional ingredients.

In an embodiment of the present invention, provided is a process for producing a chocolate product where all ingredients are from a cocoa pod, i.e. the chocolate product consists essentially of ingredients derived from a cocoa pod.

In an embodiment of the present invention, in the production of a chocolate product the dried cocoa pulp or cocoa pulp extract is combined with the other ingredients at the point where added sugar is normally introduced.

In an embodiment of the present invention, provided is a process for preparing a chocolate product comprising the steps of combining a cocoa mass of the present invention and a cocoa pulp or an extract of cocoa pulp. In an embodiment, the combining of the cocoa pulp or extract of cocoa pulp may be done by any device traditionally used to combine sugar with a cocoa mass as used in the traditional production of chocolate.

In an embodiment, the chocolate composition of the present invention may be refined using known equipment as applicable. In a preferred embodiment, the chocolate is refined to ensure a non-grainy texture. For example, the refining may be carried out to achieve a particle size (D90 measured by a Malvern Mastersizer 3000) of less than 50 microns, preferably between 15 microns and 35 microns.

In an embodiment, the traditional conching process is used to prepare the chocolate.

In an embodiment, the temperature in the conching step does not exceed 80° C., preferably does not exceed 75.5° C. and preferably does not exceed 70° C. In a preferred embodiment, the temperature is greater than 35° C., preferably greater than 40° C., preferably greater than 45° C. or greater than 50° C. or greater than 55° C.

In an embodiment, the conching is carried out for a period of greater than 5 hours, preferably greater than or equal to 10 hours, preferably greater than or equal to 15 hours. In an embodiment, the conching is carried out for a period of less than 60 hours, preferably less than 50 hours.

In an embodiment, the conching is carried out for a period of between 5 hours and 60 hours at a temperature between 40° C. and 80° C.

When the source of sugar in the product is prepared from pulp and/or pulp extract, the temperature and duration of conching is preferably controlled to meet the parameters below.

In a preferred embodiment, the temperature in the conching step does not exceed 60° C., preferably does not exceed 57.5° C. and preferably does not exceed 56° C. By controlling the temperature during this step, caramelisation of the pulp is avoided and the texture of the final product is not grainy. In a preferred embodiment, the temperature is greater than 30° C., preferably greater than 35° C. or greater 40° C. or greater than 45° C.

In an embodiment, the conching is carried out for a period of greater than 1.5 hours, preferably greater than or equal to 2 hours, preferably greater than or equal to 2.5 hours. In an embodiment, the conching is carried out for a period of less than 8 hours, preferably less than 6 hours.

In an embodiment, the conching is carried out for a period of between 1.5 hours and 8 hours at a temperature between 30° C. and 60° C.

In an embodiment, the conching speed is between 200 rpm and 2000 rpm, preferably between 400 rpm and 1600 rpm.

In a preferred embodiment, the pulp and/or pulp extract is not caramelised, for example, the process steps used to produce the composition of the invention do not lead to caramelisation.

In an embodiment, the conching speed and/or temperature may vary over the conching step within the above ranges.

Unless defined otherwise, all technical and scientific terms used herein have and should be given the same meaning as commonly understood by one of ordinary skill in the art to which this invention belongs.

Unless the context clearly indicates otherwise, as used herein plural forms of the terms herein are to be construed as including the singular form and vice versa.

In all ranges defined above, the end points are included within the scope of the range as written. Additionally, the end points of the broadest ranges in an embodiment and the end points of the narrower ranges may be combined.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole. Preferably, where appropriate (for example in amounts of ingredient) such percentages are by weight.

Unless otherwise specified, the percentages listed are by weight.

The present invention is further described by reference to the non-limiting specific examples.

EXAMPLES

Reference Example 1

Preparation of Cocoa Pulp Powder

Cocoa pods of varieties PH16, Salobrinho and CCN51 were washed in running water. They were then immersed in chlorinated water containing 200 mg/L of free chlorine for 10 minutes. They were then washed with chlorinated water containing 5 mg/L of free chlorine by spraying.

The fruits were broken manually with the help of stainless steel knives. Then, the pulp seeds were separated from the bark.

The pulping was performed on a commercially available fruit pulper using a brush system. The pulp was collected directly in 40×50 cm polypropylene plastic bags, which were sealed under vacuum. After packing, the pulps were frozen and stored at −18° C.

Example A

Initially the pulps were thawed. Then, for the enzymatic treatment, batches of 3.0 kg of pulp were placed in a jacketed reactor and the temperature was raised to 42.5° C. with the aid of a thermostatic bath, when the temperature was reached, the enzyme (Pectinex® Ultra Clear, Novozymes) was added under the following conditions:

Concentration: 1 mL of enzyme/100 g of pulp
Temperature: 42.5° C.
Reaction time: 60 minutes
Rotation 100 rpm Shortly after the enzymatic treatment, heat treatment was performed at 90° C. for 5 minutes and cooling at 20° C. The cooled material was frozen for further lyophilisation treatment.

Example B

At the end of the 60 minutes of enzymatic reaction described in Example A, a sample was taken and enough calcium hydroxide was added to the pulp to adjust the pH to approximately 5.0. The following conditions were used:

12.9 g of Ca(OH)2 were added to each 3 kg of pulp (0.43%);

Mixing was carried out with the mixer at a speed of 200 rpm for about 15 minutes; and The pasteurization was then carried out at 90° C. for 5 minutes and cooled to 20° C.

The cooled material was frozen and taken to lyophilization.

Lyophilization of the cocoa pulp was conducted on Lio Top equipment for 96 hours in two batches. In each batch, 8 trays were placed with 2.5-3.0 kg/tray.

After the lyophilization process was complete, the trays with dehydrated pulp were removed from the equipment.

The lyophilized pulp was removed from the trays and placed in rolled bags, which were then vacuum sealed, providing freeze-dried cocoa pulp powder.

Testing

Prior to lyophilisation, the pH of the natural pulp, the enzymatically treated pulp and the bi-treated pulp were found to be 3.52±0.32, 3.36±0.02 and 4.77±0.05 at 20° C., respectively, based on the mean of two sets of measurements.

Viscosity measurements were taken based on the mean of two sets of measurements using a Brookfields RVDV IIIl rheometer at 30° C. with rotation for 60 s.

Apparent viscosity (100 rpm) Apparent viscosity (250 rpm) for natural pulp, 611.5±2.12 and 322.5±3.53, pulp enzymatically treated 400.0±14.14 and 162.5±10.60 and pulp enzymatically treated with pH adjustment 392.5±12.43 and 158±11.32 (all results are reported in centipoise).

Accordingly, it can be seen that the treatment of the present invention provides a reduction in viscosity.

The cocoa pulp powders from the preparation example above and Examples A and B were assessed using HPAEC-PAD to determine the sugar contents using the below procedure: Samples are dissolved in deionised water at a pH above at room temperature, heated at 70° C. for 27 minutes, cooler and centrifuged and a diluted aliquot is prepared. The aliquot is filtered using a 0.2 micron syringe and sugars are separated using an anion exchange polystyrene-divinylbenzene column with aqueous sodium hydroxide as eluent and the eluted carbohydrates are detected using PAD.

| Sugars | Preparation Example 1/ PH16 | Preparation Example 1/ Salobrino | Example 5 | Example 6 |
|---|---|---|---|---|
| DISACCHARIDES | | | | |
| Lactose (g/100 g) | Trace | Trace | Trace | Trace |
| Maltose (g/100 g) | Trace | Trace | Trace | 0.38 |
| Sucrose (g/100 g) | 14.75 | 28.19 | 3.91 | 2.26 |
| MONOSACCHARIDES C6-BODIES | | | | |
| Fructose (g/100 g) | 30.51 | 24.78 | 34.28 | 34.48 |
| Fucose (g/100 g) | Trace | Trace | Trace | Trace |
| Galactose (g/100 g) | Trace | Trace | Trace | Trace |
| Glucose (g/100 g) | 28.94 | 23.12 | 33.24 | 33.47 |
| Rhamnose (g/100 g) | Trace | Trace | Trace | Trace |
| TOTAL SUGAR g/100 g | 74.2 | 76.09 | 71.43 | 70.59 |

The total sugar content relates to the sugars measured—e.g. does not include any oligosaccharides that may be present.

Additionally, frozen pulp obtained from Ricaeli was dried and assessed as follows.

Total sugars in cocoa pulp samples were measured by high performance anion exchange chromatography with pulsed amperometric detection (HPAEC-PAD). Sugars from samples were extracted in hot water and injected in the HPAEC-PAD system. Neutral sugars being weak acids are partially ionized at high pH and can be separated by anion-exchange chromatography on a base-stable polymeric column (CarboPac PA20). Sugars are detected by measuring the electrical current generated by their oxidation at the surface of a gold electrode.

Total dietary fiber, and its fractions, in cocoa pulp samples were measured by the enzymatic-gravimetric method Rapid Integrated Total Dietary Fiber method as described in Journal of AOAC International, Volume 102, Number 1, January-February 2019, pp. 196-207(12).

Proteins content was determined by Kjeldahl which consists in a sulfuric acid digestion to decompose organic compound and libertate nitrogen as ammonia sulfate. It is followed by a distillation in presence of sodium hydroxide to convert ammonium to ammonia. The ammonia content, thus nitrogen is determined by titration. The amount of nitrogen is converted to proteins by multiplying by the conversion factor 6.25.

Lignin content in cocoa pulp was measured with the AACC International Method 32-25.01.

Fat content is measured using acid hydrolysis preferably using ISO 8262-1.

Raw cocoa pulp is predominantly composed by mono- and disaccharides (79% by weight dry matter) and dietary fiber constitutes 6.5% of this pulp tested. Soluble dietary fiber of high molecular weight is the main component of the dietary fiber fraction in raw cocoa pulp followed by the insoluble fiber. These results indicate that cocoa pulp fiber does not contain a significant amount of oligosaccharides given that the average degree of polymerization (DP) of Soluble dietary fiber—High molecular weight is >12 mono-saccharide units (Okhuma et al., 2000. J AOAC Int. Volume 83, Number 4, Pages 1013-1019). In addition, a sample of the freeze-dried powder containing the insoluble fiber and soluble dietary fiber-high molecular weight was subjected to analysis with SEC-MALS. For this analysis, the sample was partially dissolved in DMSO and results indicated an average molecular weight of 9.5 kDa, which translates into DP 50-60.

| | % dry matter |
|---|---|
| Total Solids | 14 (post-drying) |
| Lactose | n.a. |
| Maltose | 0.2 |
| Sucrose | 0.2 ± 0.2 |
| Glucose | 38.7 ± 0.1 |
| Fructose | 40.2 ± 0.1 |
| Galactose | n.a. |
| Total Sugars | 79.3 |
| Total Dietary Fiber | 6.58 ± 0.04 |
| Insoluble dietary fiber | 2.83 ± 0.15 |
| Soluble dietary fiber - High molecular weight | 3.36 ± 0.12 |
| Soluble dietary fiber - Low molecular weight | 0.39 ± 0.00 |
| Total Protein (N × 6.25) | 3.68 ± 0.3 |
| Citric acid | 9.5 |
| Lignin | 0 |

Reference Example 2

30 g of cocoa pulp from the same source as used in Example 1 was introduced into a Rapid Viscosity Analyser (RVA) aluminium cup and stabilized for 5 min at 40° C. under stirring at 50 rpm. Then, 150 µL of liquid enzyme or 150 mg of enzyme powder was added dependent on the enzyme form. Stirring was increased to 960 rpm for 8 s and went back to 50 rpm, temperature remained at 40° C. Temperature was maintained at 40° C. for additional 45 min prior to increase up to 90° C. for inactivation of the enzyme for 10 min. Average viscosity was calculating the average of the values obtained between time 41 and 49 min of each run.

Reduction of viscosity was calculated based on the loss of viscosity versus non-treated sample and was expressed as a percentage.

The polygalacturonase activity was measured at 40° C., hydrolysing polygalacturonic acid (Megazyme P-PGAT) at 5.0 g/mL in 100 mM acetate buffer pH 4.5. Samples were taken out after exactly 2, 4, 6, 8, 10 and 12 min to establish kinetic curves. DNS reagent solution (1% 3,3-dinitrosalicylic acid+1.6% NaOH+40% K Na tartrate tetrahydrate) was immediately added to stop the enzymatic reaction and color the released reducing ends, boiling the samples for 10 min. Finally, the Absorbance was read at 540 nm. Galacturonicacid was used as standard to establish the calibration curve.

Enzyme assay: modified endo-cellulase CellG5 kit procedure from Megazyme. The cellulase activity was measured at 37° C., in 100 mM acetate buffer pH 4.5 containing 1 g/L bovine serum albumin. The enzymatic reaction was stopped after exactly 2, 4, 6, 8, 10 and 12 mi to establish kinetic curves, adding 2% TRIS buffer pH 10.0. Finally, the absorbance was read at 405 nm. P-nitrophenol was used as standard to establish the calibration curve. An average of 3 readings was taken.

| Enzyme | Reduction in viscosity/% | Activity/PGN micromole/ min/g | Activity/ Cellulase/ micromole/ min/g |
|---|---|---|---|
| Cellulosin GMY (HBI Enzymes Inc.) | 96.3 | 475 | 2500 |
| Cellulase FG conc (EDC) | 93.9 | 426 | 2380 |
| Rapidase ® Fibre (DSM) | 73.3 | 2599 | 159 |
| Pectinex ® Ultra Clear (Novozyme) | 72.7 | 10347 | 31 |
| Rohapect ® B1L (AB Enzymes) | 72.4 | 9 | 333 |
| Pectinex ® UF(Novozyme) | 71.7 | 3573 | 7 |
| Pectinex ® Ultra Color (Novozyme) | 71.6 | 9609 | 42 |
| Klerzyme 150 (DSM) | 69.9 | 4342 | 43 |
| Pectinex ® Ultra SP-L (Novozyme) | 69.8 | 3596 | 6 |
| Cellulosin HC (HBI Enzymes Inc.) | 68.6 | 122 | 514 |
| Hemicellulase conc (Sigma) | 61.3 | 2311 | 142 |
| Maxinvert L10000 (DSM) | 4.79 | 0 | 0 |
| Aromase ® (Amano Enzyme Europe) | 1.23 | 41 | 5 |

Example 1

Unfermented, unroasted cocoa beans and cocoa pulp were pasteurised and mixed using a bowl cutter under vacuum at 80° C. for 20 minutes to form a paste. The paste was placed in trays and dried for 45 hours at 7000. Using a Mettler-Toledo, halogen moisture analyser the following water content, AM wt %, results were obtained:

After 22 hr at 70° C.=% AM 16.66

After 27 hr at 7000=% AM 5.40

After 45 hr at 70° C.=% AM 1.96

Dark chocolate was prepared using 1.8 kg of sugar, 3.9 kg of the dried mass described above, 0.02 kg lecithin, 0.6 kg of cocoa butter and 0.01 kg of vanilla were mixed, conched and formed into a chocolate product.

Milk chocolate was prepared using 2.0 kg milk powder, 2.5 kg of sugar, 1.2 kg of the dried mass described above, 0.02 kg lecithin, 1.2 kg of cocoa butter and 0.01 kg of vanilla were mixed, conched and formed into a chocolate product.

Specifically, Sugar and dried cocoa was mixed together and refined on Buehler Refiner 3 cylinders, three times in order to reduce the particle size to 20 microns. Conching was carried out for 12 hours at 65° C. for the milk chocolate and 24 hours at 70° C. for the dark chocolate.

Example 2

120 g of natural baker's yeast was added to 3 kg of pasteurized cocoa paste and placed in a stove at 30° C. for 24 hours. Subsequently, the fermented mass was roasted at 175° C. for 40 minutes.

Dark chocolate was prepared using 1.8 kg of sugar, 3.9 kg of the dried mass described above, 0.02 kg lecithin, 0.6 kg of cocoa butter and 0.01 kg of vanilla were mixed, conched and formed into a chocolate product.

Specifically, Sugar and dried cocoa was mixed together and refined on Buehler Refiner 3 cylinders, three times in order to reduce the particle size to 20 microns. Conching was carried out for 48 hours at 70° C.

Example 3

Unroasted, fermented isolated cocoa beans and cocoa pulp from Ricaeli were combined (150 g:275 g) and processed in a food processor at full speed for 20 minutes. 300 g of the paste was tray dried for 24 hours at 70° C. The dried mass was ground into pieces to form a powder. 229.5 g of the mass were mixed with 40.5 g of cocoa butter refined and conched at 40° C. for 7 hours.

Example 4

The preparation of the non-enzymatically treated flake (CPP flake) was carried out according to the following process. 20 kg of unfermented pulp, bean, placenta were ground in a bowl cutter at 80° C. for 20 minutes (paste of pH 4.9 was produced) and then pH adjusted to pH 5.5 with KOH. The solids content was measured with a Mettler-Toledo halogen moisture balance at 105° C. for 13 minutes to yield a result of 72.9%.

The paste was then dried in trays in an oven at 75° C. or at 50° C. to yield flakes.

| Drying Time | % Moisture |
|---|---|
| Initial | 27.1 |
| 5 hours | 18.2 |
| 20 hours | 22.1 |
| 24 hours | 19.5 |
| Overnight at 50° C. | 14.0 |

The flake was then moved to a roasting oven and roasted at 120° C. (measured product temperature) for 20 minutes. The roasting time was controlled by the appearance and taste of the flake. The final product had a yield of 38%, fat content of 38.83% and 3.97% moisture content.

Example 5

The preparation of the enzymatically treated flake (CPP flake) was carried out according to the following process. 20.8 kg of unfermented pulp, bean, placenta were ground in a bowl cutter at 80° C. for 20 minutes (paste of pH 4.9 was produced) The paste was then enzyme treated based on a wt % of the paste:

| % w/w | Enzymes |
|---|---|
| 0.5 | Cellulosin GMY |
| 0.5 | Pectinex Ultra Clear |
| 0.5 | Amylase AD11 MDP |
| 0.5 | AMG 1100 BG |

100 g of each enzyme was weighed into 3020 g of water and added to the paste. The mixture was left stirring in the mixer running at low speed for 2 hours at 50° C. There was a significant reduction of viscosity following the enzymatic treatment, it turned the paste into a thin, homogenous fluid. The increase of sweetness was also very noticeable.

The pH was adjusted to pH 5.5 with KOH.

The paste was then dried in trays in an oven at 75° C. for 19 hours to yield flakes. The moisture of the flake at the end of the drying process was 8.3% (105° C. for 13 min).

The flake was then moved to a roasting oven and roasted at 110° C. (measured product temperature) for 15 minutes. The roasting time was controlled by the appearance and taste of the flake. The final product had a yield of 32%, fat content of 36.90% and 5.15% moisture content.

Example 6

The chocolate mass recipes were based on the 70% dark chocolate, which contains 70% cocoa solids (from all sources—i.e. including pulp and placenta), 48% fat and no emulsifiers. The batches of both flakes, with and without enzymatic treatment, were split in half to allow the making of 2 chocolate mass variants per flake, one containing sucrose and the other containing cocoa pulp powder.

Example 6a

| | % | % Fat | Refining Kg | Conche Kg | Final Qty Kg |
|---|---|---|---|---|---|
| No Enz CPP Flake | 36.00 | 38.90 | 3.500 | 0.000 | 3.500 |
| Sugar | 30.00 | 0.00 | 2.917 | 0.000 | 2.917 |
| Cocoa butter | 34.00 | 100.00 | 0.700 | 2.606 | 3.306 |
| Refined Flake | | | | 7.117 | |
| TOTAL | 100.00 | | 7.117 | 9.722 | 9.722 |
| % Sugar | 30.00 | | | | |
| % Fat | 48.00 | | 29.0% | | |
| % Cocoa Solids | 70.00 | | | | |

Example 6b

| | % | % Fat | Refining Kg | Conche Kg | Final Qty Kg |
|---|---|---|---|---|---|
| No Enz CPP Flake | 36.50 | 38.90 | 3.500 | 0.000 | 3.500 |
| Cocoa Pulp Powder | 30.00 | 1.00 | 2.877 | 0.000 | 2.877 |
| Cocoa butter | 33.50 | 100.00 | 0.700 | 2.512 | 3.212 |
| Refined Flake | | | | 7.077 | |
| TOTAL | 100.00 | | 7.077 | 9.589 | 9.589 |
| % Pulp solids | 30.00 | | | | |
| % Fat | 48.00 | | 29.5% | | |
| Cocoa Solids | 70.00 | | | | |

Example 6c

| | % | % Fat | Refining Kg | Conche Kg | Final Qty Kg |
|---|---|---|---|---|---|
| Enz CPP Flake | 35.30 | 36.90 | 3.497 | 0.000 | 3.497 |
| Cocoa Pulp Powder | 30.00 | 1.00 | 2.972 | 0.000 | 2.972 |
| Cocoa butter | 34.70 | 100.00 | 0.800 | 2.638 | 3.438 |
| Refined Flake | | | | 7.269 | |
| TOTAL | 100.00 | | 7.269 | 9.907 | 9.907 |
| % Pulp solids | 30.00 | | | | |
| % Fat | 48.03 | | 29.2% | | |
| % Cocoa Solids | 70.00 | | | | |

Example 6d

| | % | % Fat | Refining Kg | Conche Kg | Final Qty Kg |
|---|---|---|---|---|---|
| Enz CPP Flake | 35.00 | 36.90 | 3.497 | 0.000 | 3.497 |
| Sucrose | 30.00 | | 2.997 | 0.000 | 2.997 |
| Cocoa butter | 35.00 | 100.00 | 0.850 | 2.647 | 3.497 |
| Refined Flake | | | | 7.344 | |
| TOTAL | 100.00 | | 7.344 | 9.991 | 9.991 |
| % Sugar | 30.00 | | | | |
| % Fat | 47.92 | | 29.1% | | |
| % Cocoa Solids | 70.00 | | | | |

The method of Example 1 was followed to prepare chocolate with the exception that the conching temperature was 40° C.

The cocoa pulp powder was prepared by the method of WO2019149909, Example 14.

The particle size of the flake used in Examples 6a and 6b was measured using a Malvern Mastersizer 2000, Method Scirocco 2000 dry attachment, Fraunhofer scattering theory after refining on the 3-roll refiner. Example 6a had a D90 of 16 microns and Example 6b of 38 microns.

The enzymatic treatment was shown to reduce the viscosity during the conching step. However, all samples were homogenous. The enzymatic process was also shown to increase sweetness. It is noted that the drying and roasting processes may impact the amount of final sugars due to caramelisation and Maillard reactions.

Example 7

As mentioned above, the aim of the present invention is to use all the inner components of cocoa fruit, which typically comprises of 77% husk, 13% bean, 8% pulp and 2% placenta. The composition of cocoa puree made of bean, pulp and placenta, was analysed and the results are given in Table 10. It shows that it comprises of approximately 8% sugar (>90% fructose and glucose mixture at a ratio close to 1:1), 13% fat, 6.5% fibres (85% insoluble fibres), 4.5% protein and 62% moisture. The pH of coca puree is 4.9.

| Cocoa Puree | % (wet basis) | % (dry basis) |
|---|---|---|
| Cocoa Bean | 55.0 | 80.0 |
| Cocoa Pulp | 35.0 | 15.0 |
| Placenta | 10.0 | 5.0 |

| | Bean/Pulp/ Placenta Puree | | Bean/Pulp/ Placenta Puree Enz treated + pH 5.5 | | Bean/Pulp/Placenta Puree Enz treated + pH 5.5 + Dried | | Bean/Pulp/Placenta Puree Enz treated + pH 5.5 + Dried + Roast | |
|---|---|---|---|---|---|---|---|---|
| | wet Basis | Dry Basis | wet Basis | Dry Basis | wet Basis | Dry Basis | wet Basis | Dry Basis |
| Sugars and derivatives by HLPC: | | | | | | | | |
| DISACCHARIDES | | | | | | | | |
| Lactose (g/100 g) | <0.30 | <0.30 | <0.30 | <0.30 | <0.30 | <0.30 | <0.30 | <0.30 |
| Maltose (g/100 g) | <0.30 | <0.30 | <0.30 | <0.30 | <0.30 | <0.30 | 0.51 | 0.54% |
| Sucrose (g/100 g) | 0.51 | 1.35% | <0.30 | <0.30 | 0.64 | 0.72% | 0.97 | 1.03% |
| MONOSACCHARIDES | | | | | | | | |
| Fructose (g/100 g) | 3.97 | 10.52% | 3.54 | 10.52% | 8.47 | 9.51% | 7.65 | 8.16% |
| Galactose (g/100 g) | <0.30 | <0.30 | <0.30 | <0.30 | <0.30 | <0.30 | <0.30 | <0.30 |
| Glucose (g/100 g) | 3.74 | 9.91% | 5.93 | 17.62% | 8.11 | 9.11% | 4.95 | 5.28% |
| TOTAL SUGAR g/100 g | 8.22 | 21.77% | 9.47 | 28.14% | 17.52 | 19.67% | 14.08 | 15.01% |
| physical: | | | | | | | | |
| Moisture % Oven Dry, 102° C., 5 hr. 5 g | 62.65 | | 66.35 | | 10.93 | | 6.21 | |
| Ashes (g/100 g) | 1.32 | 3.50% | 1.70 | 5.05% | 4.43 | 4.97% | 4.76 | 5.08% |
| Macro Nutrients: | | | | | | | | |
| Fat (g/100 g) | 13.36 | 35.39% | 11.34 | 33.70% | 30.82 | 34.60% | 32.33 | 34.47% |
| Protein (g/100 g) | 4.74 | 12.56% | 4.37 | 12.99% | 12.06 | 13.54% | 12.81 | 13.66% |
| Total Carbohydrate (g/100 g) | 18.33 | 48.56% | 16.24 | 48.26% | 41.76 | 46.88% | 43.8 | 46.80% |
| Total Dietary Fibres (g/100 g) | 6.55 | 17.35% | 5.00 | 14.86% | 9.37 | 10.52% | 11.44 | 12.20% |
| Insoluble Fibres (g/100 g) | 5.60 | 14.83% | 2.46 | 7.31% | 6.20 | 6.96% | 6.10 | 6.50% |
| Soluble Fibres (g/100 g) | 0.95 | 2.52% | 2.54 | 7.55% | 3.17 | 3.56% | 5.35 | 5.70% |
| Energy (kcal/100 g) | 199.42 | | 174.50 | | 473.92 | | 494.89 | |

| | 70% Dark Enz-treated CPP + Pulp Powder | | | | |
|---|---|---|---|---|---|
| | Cocoa Pulp Powder 30.0% | CPP Flake 35.3% | Cocoa Butter 34.7% | TOTAL (%) | Batch 841643 NQAC Results % |
| Fat | 0.30 | 11.41 | 34.70 | 46.41 | 46.32 |
| Protein | 1.50 | 4.52 | 0.00 | 6.02 | 6.29 |
| Total Sugars | 17.70 | 4.97 | 0.00 | 22.67 | 21.75 |
| Fructose | 9.30 | 2.70 | 0.00 | 12.00 | 11.69 |
| Glucose | 8.10 | 1.75 | 0.00 | 9.85 | 9.57 |
| Sucrose | 0.30 | 0.34 | 0.00 | 0.64 | 0.49 |
| Total Dietary Fibres | 5.01 | 4.04 | 0.00 | 9.05 | 10.1 |
| TIF | 3.01 | 2.15 | 0.00 | 5.16 | 5.62 |
| TSF | 2.00 | 1.89 | 0.00 | 3.89 | 4.48 |
| Organic acids | | | | | |
| Energy | | | | | |
| Moisture | 1.20 | 2.19 | | 3.39 | 3.38 |

| | Chocolate No-Enz Flake 840432 + Sugar | Chocolate No-Enz Flake 840432 + Pulp Powder | Chocolate Enz Flake 840436 + Sugar | Chocolate Enz Flake 840436 + Pulp Powder | Tarantino 70% Dark |
|---|---|---|---|---|---|
| | | | Batch number: | | |
| | 843464 | 843468 | 841646 | 841643 | Chocolate |
| Sugars and derivatives by HLPC: | | | | | |
| DISACCHARIDES | | | | | |
| Lactose (g/100 g) | <0.30 | <0.30 | <0.30 | <0.30 | <0.30 |
| Maltose (g/100 g) | <0.30 | <0.30 | <0.30 | <0.30 | <0.30 |
| Sucrose (g/100 g) | 31.07 | 0.83 | 31.33 | 0.49 | <0.30 |

-continued

| | Chocolate No-Enz Flake 840432 + Sugar | Chocolate No-Enz Flake 840432 + Pulp Powder | Chocolate Enz Flake 840436 + Sugar | Chocolate Enz Flake 840436 + Pulp Powder | Tarantino 70% Dark |
|---|---|---|---|---|---|
| | | | Batch number: | | |
| | 843464 | 843468 | 841646 | 841643 | Chocolate |
| MONOSACCHARIDES | | | | | |
| Fructose (g/100 g) | 2.32 | 11.36 | 2.91 | 11.69 | 9.17 |
| Galactose (g/100 g) | <0.30 | <0.30 | <0.30 | <0.30 | <0.30 |
| Glucose (g/100 g) | 0.69 | 8.35 | 2.13 | 9.57 | 7.82 |
| TOTAL SUGAR g/100 g | 34.08 | 20.54 | 36.37 | 21.75 | 16.99 |
| Estimated Relative Sweetness physical: | 34.41 | 21.14 | 36.53 | 22.17 | 17.26 |
| Moisture % Oven Dry, 102° C., 5 hr. 5 g | 1.37 | 3.07 | 1.64 | 3.38 | 2.00 |
| Ashes (g/100 g) Macro Nutrients: | 1.50 | 3.25 | 1.68 | 3.49 | 3.27 |
| Fat (g/100 g) | 47.1 | 46.82 | 46.25 | 46.32 | 49.76 |
| Protein (g/100 g) | 4.65 | 6.13 | 4.48 | 6.29 | 7.99 |
| Total Carbohydrate (g/100 g) | 45.38 | 40.73 | 45.95 | 40.52 | 36.98 |
| Total Dietary Fibres (g/100 g) | 5.99 | 12.92 | 3.23 | 10.10 | 12.84 |
| Insoluble Fibres (g/100 g) | 3.84 | 7.96 | 1.82 | 5.62 | 9.91 |
| Soluble Fibres (g/100 g) | 2.15 | 4.96 | 1.41 | 4.48 | 2.93 |
| Energy (kcal/100 g) | 612.04 | 582.98 | 611.51 | 583.92 | 602.04 |

The estimated composition of the recipe of the chocolate with enzymatically-treated CPP and cocoa pulp powder was calculated based on the composition of its ingredients. The estimated composition shows very good agreement with the analytical results. It also indicates that the chocolate composition was not altered by the chocolate making process.

Example 8

20 kg of wet beans (comprised of: cocoa beans, pulp and placenta) were milled to a puree using a Stephan Mixer (Model: UM-60; 72 L volume) while heating to a target temperature of 8000 to pasteurise.

The pH of pasteurized cocoa puree (at 4500) was measured by diluting 1:1 with water (2200). The pH of the pasteurized cocoa puree was found to be 5.3 at 28.1° C. The pH of the puree was adjusted to targeted pH of 5.5 (+/−0.1) with a 15M KOH solution. For 20 kg of cocoa puree, ~20-25 g of 15N KOH was added to achieve the targeted pH.

The samples were tray dried as follows to form flakes:

| Kg/tray | Total kg dried | Drying temp (° C.) | Total drying time (hours) | kg Dry Flake (kg) | Moisture after drying (%) |
|---|---|---|---|---|---|
| 2 | 20 | 90 | 16.00 | 6.15 | 1.69 |
| 3 | 33 | 90 | 15.50 | 10.60 | 5.09 |
| 2 | 14 | 75 | 16.75 | 4.70 | 3.75 |
| 2 | 14 | 75 | 16.00 | 4.66 | 3.84 |

The 750 and 90° C. dried flakes were then roasted in a fan oven at either 105° C. or 125° C. The moisture content was monitored using a halogen moisture analyser. The roasting parameters, final moisture content and fat content of the roasted powders are summarized in the table below.

| Sample | Kg/tray | Total kg roasted | Roasting Temp (° C.) | kg Roasted Flake (kg) | Initial Moisture before roasting (%) | Moisture after roasting (%) | Total Fat after roasting (%) |
|---|---|---|---|---|---|---|---|
| 90° C. dried Flake | 1.76 | 5.30 | 105 | 4.8 | 5.09 | 2.88 | 29.69 |
| 90° C. dried Flake | 1.76 | 5.30 | 125 | 4.4 | 5.09 | 2.40 | 30.70 |
| 75° C. dried Flake | 1.55 | 4.66 | 105 | 4.0 | 3.84 | 2.84 | 27.13 |
| 75° C. dried Flake | 1.57 | 4.70 | 125 | 3.5 | 3.75 | 1.75 | 31.7 |

Chocolate mass recipes for dark (based on the 70% chocolate mentioned above) and milk chocolate (using 18% cocoa butter, 5% milk fat, 38% sugar, 17% flake, 21.5% skimmed milk powder, 0.6% lecithin) were prepared. Refining was performed using a kitchen-scale 3roll refiner, targeting a particle size of 25 microns (D90 value measured via laser diffraction; Malvern). Cold conching was performed in a kitchen-scale Stephan mixer (~7 kg capacity) at 40° C. for 2 hours.

The chocolate was tempered and moulded using standard procedures.

Example 9

The above samples were analysed using the above methods and the results are tabulated below.

| | Bean/Pulp/ Placenta Puree | | Oven 75° C. Flake | | Oven 75° C. Ground Flake | | Oven 75° C. Ground Flake Roast 105° C./20 min | | Oven 75° C. Ground Flake Roast 125° C./20 min | | Oven 90° C. Flake | |
|---|---|---|---|---|---|---|---|---|---|---|---|---|
| | As Is | Dry Weight | As Is | Dry Weight | As Is | Dry Weight | As Is | Dry Weight | As Is | Dry Weight | As Is | Dry Weight |
| Sugars and derivatives by HLPC: DISACCHARIDES | | | | | | | | | | | | |
| Lactose (g/100 g) | <0.30 | | <0.30 | | <0.30 | | <0.30 | | <0.30 | | <0.30 | |
| Maltose (g/100 g) | <0.30 | | <0.30 | | <0.30 | | <0.30 | | <0.30 | | <0.30 | |
| Sucrose (g/100 g) | 0.38 | 1.21 | 0.79 | 0.86 | 0.84 | 0.90 | 1.14 | 1.19 | 1.22 | 1.26 | 1.25 | 1.29 |
| MONOSACCHARIDES | | | | | | | | | | | | |
| Fructose (g/100 g) | 3.41 | 10.82 | 9.99 | 10.86 | 9.97 | 10.68 | 9.34 | 9.75 | 8.72 | 8.99 | 8.90 | 9.21 |
| Galactose (g/100 g) | <0.30 | | <0.30 | | <0.30 | | <0.30 | | <0.30 | | <0.30 | |
| Glucose (g/100 g) | 3.18 | 10.09 | 6.8 | 7.39 | 6.72 | 7.20 | 4.44 | 4.63 | 3.32 | 3.42 | 4.22 | 4.37 |
| TOTAL SUGAR g/100 g | 6.97 | 22.12 | 17.58 | 19.11 | 17.53 | 18.78 | 14.92 | 15.57 | 13.26 | 13.68 | 14.37 | 14.87 |
| Estimated Relative Sweetness | 7.02 | | 18.22 | | 17.34 | | 15.90 | | 14.34 | | 15.31 | |
| Macro Nutrients: | | | | | | | | | | | | |
| Fat g/100 g) | 9.89 | 31.39 | 27.2 | 29.57 | 28.04 | 30.04 | 28.86 | 30.12 | 28.54 | 29.43 | 29.05 | 30.07 |
| Protein (g/100 g) | 4.07 | 12.92 | 12.00 | 13.04 | 12.25 | 13.12 | 12.63 | 13.18 | 12.63 | 13.03 | 12.56 | 13.00 |
| Total Carbohydrate (g/100 g) | 16.14 | 51.22 | 49.07 | 53.34 | 49.33 | 52.84 | 50.40 | 52.60 | 51.86 | 53.49 | 51.09 | 52.88 |
| Total Dietary Fibres (g/100 g) | 11.79 | 37.42 | 25.70 | 27.94 | 23.58 | 25.26 | 26.82 | 27.99 | 28.13 | 29.01 | 26.79 | 27.73 |
| Insoluble Fibres (g/100 g) | 7.62 | 24.18 | 19.50 | 21.20 | 19.99 | 21.41 | 18.53 | 19.34 | 18.97 | 19.56 | 20.56 | 21.28 |
| Soluble Fibres (g/100 g) | 4.17 | 13.23 | 6.20 | 6.74 | 3.59 | 3.85 | 8.29 | 8.65 | 9.16 | 9.45 | 6.23 | 6.45 |

| | Oven 90° C. Ground Flake | | Oven 90° C. Ground Flake Roast 105° C./20 min | | Oven 90° C. Ground Flake Roast 125° C./20 min | |
|---|---|---|---|---|---|---|
| | As Is | Dry Weight | As Is | Dry Weight | As Is | Dry Weight |
| Sugars and derivatives by HLPC: DISACCHARIDES | | | | | | |
| Lactose (g/100 g) | <0.30 | | <0.30 | | <0.30 | |
| Maltose (g/100 g) | <0.30 | | <0.30 | | <0.30 | |
| Sucrose (g/100 g) | 0.98 | 1.05 | 1.14 | 1.19 | 1.15 | 1.19 |
| MONOSACCHARIDES | | | | | | |
| Fructose (g/100 g) | 9.91 | 10.63 | 9.84 | 10.28 | 9.03 | 9.32 |
| Galactose (g/100 g) | <0.30 | | <0.30 | | <0.30 | |
| Glucose (g/100 g) | 5.81 | 6.23 | 4.79 | 5.00 | 3.66 | 3.78 |
| TOTAL SUGAR g/100 g | 16.70 | 17.91 | 15.77 | 16.47 | 13.84 | 14.29 |
| Estimated Relative Sweetness | 17.52 | | 16.78 | | 14.91 | |
| Macro Nutrients: | | | | | | |
| Fat (g/100 g) | 26.81 | 28.76 | 27.94 | 29.18 | 28.67 | 29.60 |
| Protein (g/100 g) | 12.00 | 12.87 | 12.31 | 12.86 | 12.56 | 12.97 |
| Total Carbohydrate (g/100 g) | 50.70 | 54.39 | 51.38 | 53.65 | 51.63 | 53.31 |

-continued

| | | | | | |
|---|---|---|---|---|---|
| Total Dietary Fibres (g/100 g) | 24.60 | 26.39 | 26.58 | 27.76 | 26.81 | 27.68 |
| Insoluble Fibres (g/100 g) | 17.81 | 19.11 | 18.61 | 19.43 | 17.83 | 18.41 |
| Soluble Fibres (g/100 g) | 6.79 | 7.28 | 7.97 | 8.32 | 8.98 | 9.27 |

The invention claimed is:

1. A process for producing an intermediate material for use in chocolate product composition manufacture, the process comprising producing a material derived from a plant in the *Theobroma* genus, the process comprising the steps of:
   a. reducing the size of seeds and/or a portion of seeds of a plant in the *Theobroma* genus optionally in the presence of:
      i. pulp and/or an extract of pulp of a plant in the *Theobroma* genus, and/or
      ii. a non-pulp and non-seed portion of the fruit of a plant in the *Theobroma* genus, and
   b. if both of i. and ii. are not present in step a., mixing the product of step a. with either or both of i. and/or ii., wherein the steps a. or b. provide a paste, wherein the total amount of i. and or/ii. in the mixture is produced in step a. or step b. is between 1.0 and 80.0 as a weight percentage of the mixture and the amount of the seeds and/or the portion of seeds in the mixture produced in step a. or step b. is between 20.0 and 99.0 as a weight percentage of the mixture.

2. The process of claim 1, wherein the amount of seeds and/or the portion of seeds in the mixture is between 30.0 and 90.0 as a weight percentage of the mixture.

3. The process of claim 1, wherein the size reduction involves a step selected from the group consisting of grinding, milling, crushing, grating and/or powdering.

4. The process of claim 1, wherein the size reduction involves a reduction to a size of between 10 and 500 μm.

5. The process of claim 1, wherein the seeds and/or the portion of seeds are non-roasted and/or are unfermented.

6. The process of claim 1, comprising using a non-pulp and non-seed portion selected from the group consisting of funicle, placenta, endocarp, mesocarp, endocarp, and mixtures thereof.

7. The process of claim 1, wherein the mixture is fermented after step b.

8. The process of claim 1, wherein the total amount of i. and/or ii. in the mixture is between 10.0 and 70.0 as a weight percentage of the mixture.

9. The process of claim 1, wherein the paste has a moisture content of between 0.5 and 80% as a weight percentage of the paste.

10. The process of claim 1, wherein the mixture is treated to reduce the polysaccharide content in the mixture.

11. The process of claim 10, wherein the treatment comprises treatment with an enzyme to reduce the polysaccharide content and/or increase the content of mono- and/or di-saccharides.

12. The process of claim 10, wherein the treatment comprises reducing a content of pectin, hemicellulose, cellulose and/or starch in the mixture.

13. The process of claim 12, wherein the treatment comprises treatment with at least one enzyme selected from the group consisting of pectinases, cellulases, xylanases, proteases, and amylases.

14. The process of claim 13, wherein the treatment with the at least one enzyme is carried out between 10° C. and 80° C. for between 10 minutes and 72 hours.

15. The process of claim 10, wherein the mixture is fermented after step b, and the treatment is carried out prior to, concomitant with, and subsequent to the fermentation.

16. The process of claim 1, wherein the mixture is treated to increase the content of mono- and/or di-saccharides in the mixture.

17. The process of claim 1, wherein the mixture is dried to form a dried mass.

18. The process of claim 17, wherein the dried mass has a moisture content of between 0.1 and 10% as a weight percentage.

19. The process of claim 17, wherein the mixture is dried at a temperature of between 50° C. and 200° C. and for a time period of between 1 hour and 48 hours to form the dried mass.

20. The process of claim 17, wherein the dried mass is then processed by a step of grinding, milling, crushing, grating and/or powdering.

* * * * *